US007576747B2

(12) United States Patent

Obinata

(10) Patent No.: US 7,576,747 B2
(45) Date of Patent: Aug. 18, 2009

(54) DISPLAY CONTROLLER, ELECTRONIC EQUIPMENT AND METHOD FOR SUPPLYING IMAGE DATA

(75) Inventor: Atsushi Obinata, Tokyo (JP)

(73) Assignee: Seiko Epson Corporation (JP)

( * ) Notice: Subject to any disclaimer, the term of this patent is extended or adjusted under 35 U.S.C. 154(b) by 774 days.

(21) Appl. No.: 11/167,524

(22) Filed: Jun. 27, 2005

(65) Prior Publication Data

US 2006/0001629 A1 Jan. 5, 2006

(30) Foreign Application Priority Data

Jul. 1, 2004 (JP) ............................ 2004-195607

(51) Int. Cl.
*G06F 13/00* (2006.01)
*G09G 5/02* (2006.01)
*G09G 5/36* (2006.01)

(52) U.S. Cl. ........................ 345/537; 345/589; 345/559

(58) Field of Classification Search ................. 345/537, 345/536, 530, 557, 204, 519, 501, 589, 559, 345/611, 581, 418, 545, 531
See application file for complete search history.

(56) References Cited

U.S. PATENT DOCUMENTS

| | | | | |
|---|---|---|---|---|
| 5,673,422 A * | 9/1997 | Kawai et al. | ................ | 345/519 |
| 5,864,336 A * | 1/1999 | Yano | .......................... | 713/321 |
| 6,226,017 B1 * | 5/2001 | Goossen et al. | ............. | 345/531 |
| 6,700,580 B2 * | 3/2004 | Lefebvre et al. | ............ | 345/506 |
| 6,859,236 B2 * | 2/2005 | Yui | ............................ | 348/584 |
| 6,900,530 B1 * | 5/2005 | Tsai | ........................... | 257/686 |
| 2003/0160748 A1 | 8/2003 | Kimura | | |
| 2003/0231171 A1 * | 12/2003 | Yokomichi et al. | .......... | 345/204 |

FOREIGN PATENT DOCUMENTS

| | | |
|---|---|---|
| JP | 01-156816 | 6/1989 |
| JP | 7-249116 | 9/1995 |
| JP | 08-194643 | 7/1996 |
| JP | 2003-224862 | 8/2003 |
| JP | 2003-241733 | 8/2003 |

* cited by examiner

*Primary Examiner*—Kee M Tung
*Assistant Examiner*—Joni Hsu
(74) *Attorney, Agent, or Firm*—Harness, Dickey & Pierce, P.L.C.

(57) ABSTRACT

The display controller includes a first memory storing image data and being accessed with a sequential access operation having a shorter access time than that of a random access operation, a second memory storing image data and consuming a less power than the first memory does at the time of the access operation and a data transfer control part performing an image data transfer control between the first memory and the second memory. The data transfer control part performs a transfer control to transfer the image data from the first memory to the second memory and transfer the image data written in the second memory after the image processing from the second memory to the first memory. The display controller supplies the image data in the first memory to a display driver.

16 Claims, 18 Drawing Sheets

DISPLAY CONTROLLER, ELECTRONIC EQUIPMENT AND METHOD FOR SUPPLYING IMAGE DATA

RELATED APPLICATIONS

This application claims priority to Japanese Patent Application No. 2004-195607 filed Jul. 1, 2004 which is hereby expressly incorporated by reference herein in its entirety.

BACKGROUND

1. Technical Field

The present invention relates to a display controller, electronic equipment and a method for supplying image data.

2. Related Art

Mobile devices (electronic equipment in a broad sense) such as a mobile phone often have display panels including a liquid crystal display (LCD) panel in recent years. A display panel is driven by a display driver based on image data. The image data is sometimes taken by a camera module and sometimes is generated or converted by a host. The display driver receives such image data and a display synchronizing signal and performs a driving control of the display panel.

A display controller can take over the supply of the image data and the display synchronizing signal from the host. This means that the display controller can reduce a processing load of the host. Some display controllers have memories which serve as video memories with the aim of reducing power consumption.

The display controllers mounted in the mobile devices are strongly required to be driven with low power consumption. For this reason, the memory installed in the display controller was often a static random access memory (SRAM) which uses less power compared to a dynamic random access memory (DRAM). Thereby, a capacity of the memory in the display controller tended to be relatively small. However, the small capacity of the memory was enough since a display size of the LCD panel was small. Besides, a chip size of the display controller could be small. Therefore, it was an advantage in terms of cost and packaging.

Recently, there has been great demand for a LCD panel having a display size of quarter video graphics array (QVGA) (240 pixels×320 pixels) or a larger display size. When the display size becomes larger, a data size of the image data also becomes larger. Therefore, it takes a longer time to transfer the image data from the host to the memory housed in the display controller and from the display controller to the display driver. It could also happen that a perceptible flicker appears in an image which is renewed at a certain frequency in the LCD panel. In addition, a control for image data readout from the video memory becomes complicated. This tendency gets prominent when a static image data is consecutively rewritten or a motion image data is rewritten.

Furthermore, the host cannot process other transaction during this data transfer process. It leads to a low performance of the whole system.

A disadvantage in the packaging is pointed out when the capacity of the memory becomes larger and the chip size also gets larger. However, a packaging technique has advanced recently and it is not necessarily the case that the display controller embedded with the SRAM as a memory has an advantage in the packaging.

The present invention has been developed in consideration of the above-mentioned problems, and intended to provide a display controller which can prevent the system performance from being lowered and a quality of the image from being deteriorated. The present invention also intended to provide electronic equipment and a method of supplying image data.

SUMMARY

In order to solve the above-mentioned problems, a display controller of a first aspect of the present invention includes a display driver driving a display panel and to which image data is supplied from the display controller, a first memory storing image data and being accessed with a sequential access operation having a shorter access time per predetermined data unit than an access time of a random access operation, a second memory storing image data and consuming a less power than the first memory does at a time of the access operation and a data transfer control part performing an image data transfer control between the first memory and the second memory. The data transfer control part performs a control to read out an image data from the first memory and write the image data in the second memory, an image processing is performed to the image data written in the second memory by the writing control, the data transfer control part performs a control to read out the image data that is rewritten in the second memory after the image processing from the second memory and to write the image data in the first memory, and the image data written in the first memory by the data transfer control part or the image data stored in the second memory is supplied to the display driver.

In the first aspect of the invention, the first memory storing image data is accessed with the sequential access operation having the shorter access time per predetermined data unit than the access time of the random access operation. In addition to the first memory, the second memory that consumes the less power than the first memory does at the time of the access operation is provided. The data transfer control part performs an image data transfer control between the first memory and the second memory. In other words, the data transfer control part performs the control to read out an image data from the first memory and to write the image data into the second memory. The image processing is then performed to the image data written into the second memory and the image data is rewritten in the second memory. The data transfer control part then performs a control to transfer the image data from the second memory to the first memory. The display controller supplies the image data written in the first memory by the data transfer control part or the image data stored in the second memory to the display driver. Here, it is preferred that the display controller reads out the image data written in the first memory with the sequential access operation and supplies the image data to the display driver.

According to the first aspect of the invention, the image data stored in the first memory is once transferred to the second memory. The image processing is performed to the image data in the second memory and rewritten in the second memory, and then it is again written in the first memory. In this way, it can prevent that an image processing time becomes long which is caused by the long access time of the first memory at the time of random access and the long data transfer time. Accordingly, a processing load for controlling the display controller can be allotted to other process because the data transfer time is shortened. This can help a system performance including the display controller not to be lowered.

Furthermore, the power consumption at the time of the image processing can be reduced because the second memory consuming a less power is accessed when the image data to which the image processing is performed is accessed.

The display controller may further include a first key color register in which a first key color data is set and the data transfer control part may perform a control to write an image data of a pixel that is read out from the first memory and whose pixel value is inconsistent with the first key color data into the second memory.

In the display controller, the data transfer control part may mask a writing control signal for writing the image data of the pixel read out from the first memory into the second memory if the pixel value of the pixel in the image data read out from the first memory conforms to the first key color data.

In this way, it is possible to simply perform an image composition process because the data transfer control part performs the control to write only the image data of the pixel that is read out from the first memory and whose pixel value is inconsistent with the first key color data into the second memory.

The display controller may further include a second key color register in which a second key color data is set and the data transfer control part may perform a control to write an image data of a pixel that is read out from the second memory and whose pixel value is inconsistent with the second key color data into the first memory.

In the display controller, the data transfer control part may mask a writing control signal for writing the image data of the pixel read out from the second memory into the first memory if the pixel value of the pixel in the image data read out from the second memory conforms to the second key color data.

In this way, it is possible to simply perform the image composition process because the data transfer control part performs the control to write only the image data of the pixel that is read out from the second memory and whose pixel value is inconsistent with the second key color data into the first memory.

The display controller may further include a host interface performing an interface process from and to the host. The image data read out from the second memory may be outputted to the host through the host interface. The image data after the image processing performed by the host may be inputted through the host interface and written into the second memory.

The display controller may further include an image processing part performing the image processing to the image data read out from the second memory and writing the image data after the image processing into the second memory.

In the display controller, the image processing part may perform at least one of processes including an averaging process, an edge enhancing process, an isolated point removing process and a color tone modifying process to the image data read out from the second memory.

The display controller may further include a display driver interface for supplying the image data written in the first memory by the data transfer control part or the image data stored in the second memory to the display driver.

In the display controller, the first memory may be a dynamic random access memory and the second memory may be a static random access memory.

The display controller may be a stacked type semiconductor device in which a first chip including the first memory and a second chip including the second memory and the data transfer control part are piled up.

In this way, it is possible to mount the first memory on electric equipment with a small mounting area even though the first memory has a large capacity. It does not have any disadvantages compared with a display controller that only has a memory with a small chip size in terms of the packaging. It rather has an advantage of the large capacity of the first memory.

Electronic equipment of a second aspect of the invention includes any of the above-described display controllers and a display driver driving the display panel based on an image data supplied from the display controller.

The Electronic equipment may further include a host inputting and outputting the image data to/from the display controller.

According to the second aspect of the invention, it is possible to provide electronic equipment which can prevent from the performance of the system and the image quality from being deteriorated.

A method for supplying image data to a display driver that drives a display panel of a third aspect of the invention includes a step of reading out an image data stored in a first memory and writing the image data in a second memory, a step of performing an image processing to the image data written in the second memory and writing the image data after the image processing in the second memory, a step of reading out the image data after the image processing from the second memory and writing the image data in the first memory and a step of supplying the image data written in the first memory to the display driver.

In the method for supplying image data, an image data of a pixel that is read out from the first memory and whose pixel value is inconsistent with a predetermined first key color data may be written into the second memory.

In the method for supplying image data, an image data of a pixel that is read out from the second memory and whose pixel value is inconsistent with a predetermined second key color data may be written into the first memory.

In the method for supplying image data, the first memory may be a dynamic random access memory and the second memory may be a static random access memory.

DETAILED DESCRIPTION

Embodiments of the present invention will now be described in detail with reference to the accompanying drawings. Note that the embodiments described hereunder do not in any way limit the scope of the invention defined by the claims laid out herein. Note also that all of the elements of these embodiments should not be taken as essential requirements to the means of the present invention.

1. Display System

Figure 1:
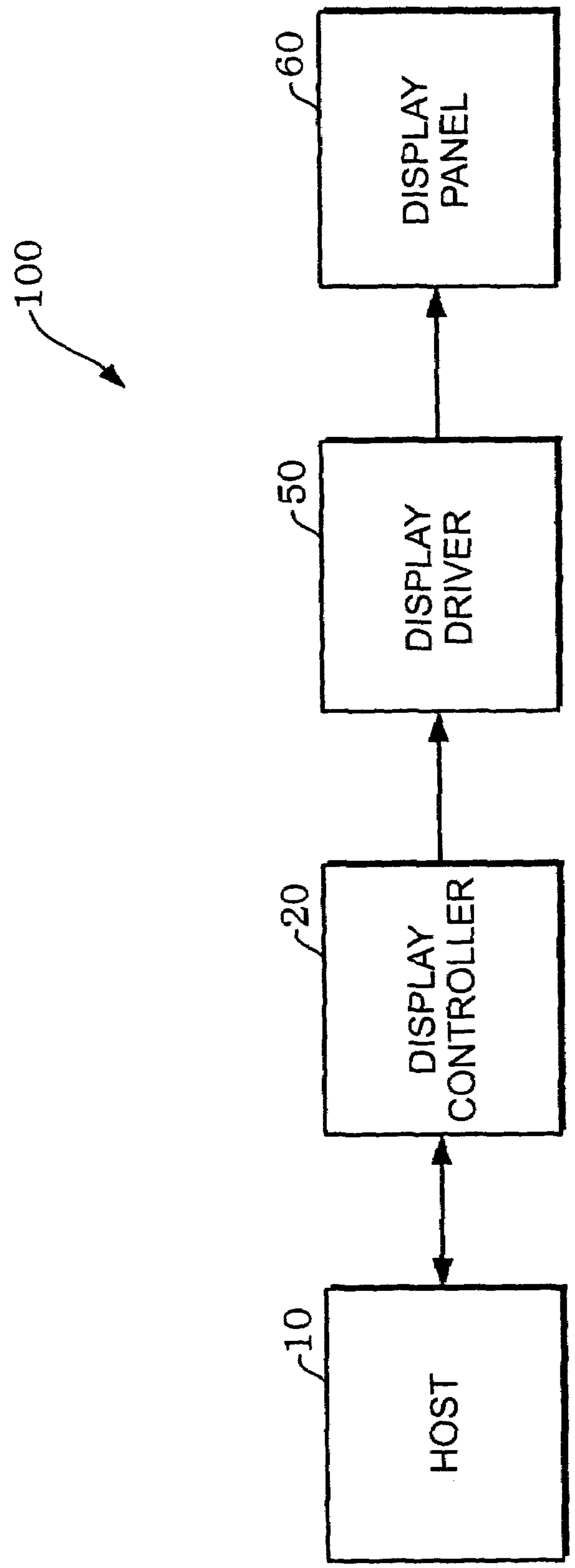
FIG. 1 is a block diagram showing a configuration example of a display system to which a display controller according to an embodiment of the present invention is applied.

FIG. 1 shows a configuration example of a display system to which a display controller according to an embodiment of the present invention is applied. For example, the display system shown in FIG. 1 is mounted on electronic equipment.

A display system 100 includes a host 10, a display controller 20, a display driver 50 and a display panel 60. The host 10 has a central processing unit (CPU) and a memory. The CPU reads out a program stored in the memory and performs a process corresponding to the program. In this way, a certain function is realized. Here, the host 10 generates or converts an image data which corresponds to an image displayed on the display panel 60 and supplies the image data to the display controller 20.

The display controller 20 can supply the image data from the host 10 to the display driver 50 that drives the display panel 60. The display controller 20 can also supply the processed image data.

The display driver 50 can drives the display panel 60 based on the image data supplied form the display controller 20. As the display panel 60, for example, an active matrix type or a simple matrix type LCD panel may be adopted.

As described above, the display controller 20 is provided between the host 10 and the display driver 50. The display controller 20 can take over, for example, a process of converting the image data from the host. This means that the display controller 20 can reduce a processing load of the host 10.

2. Display Controller

Figure 2:
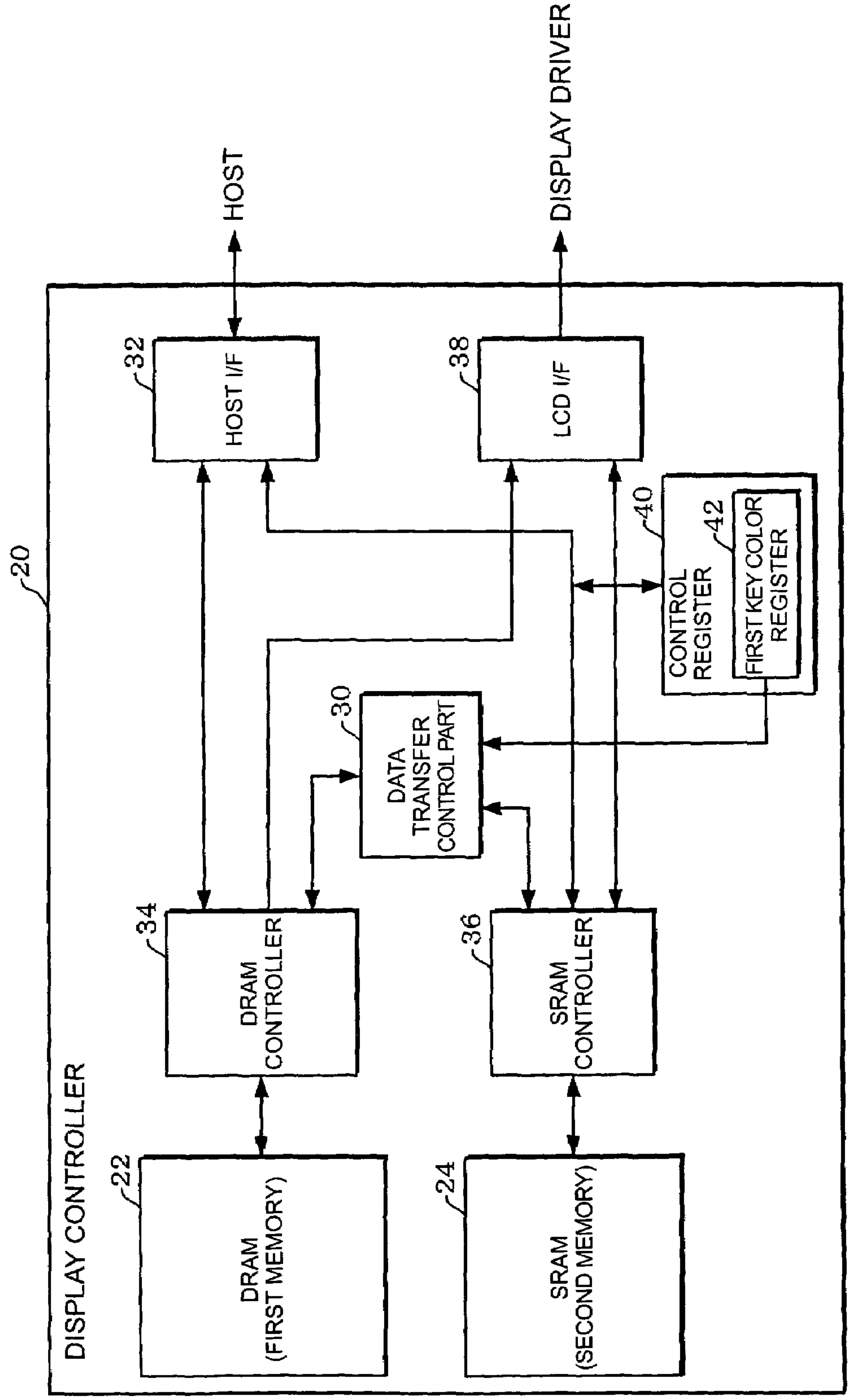
FIG. 2 is a block diagram showing a configuration example of the display controller according to the embodiment.

FIG. 2 is a block diagram showing a configuration example of the display controller 20 according to the embodiment.

The display controller 20 includes a dynamic random access memory (DRAM) 22 (a first memory) and a static random access memory (SRAM) 24 (a second memory). Here, though the DRAM 22 consumes more power than the SRAM 24 does at the time of access (reading or writing), the DRAM 22 has a larger storage capacity than that of the SRAM 24. In other words, the SRAM 24 consumes less power than the DRAM 22 does at the time of the access (reading or writing) though it has a smaller storage capacity than that of the DRAM 22.

The display controller 20 also includes a data transfer control part 30 (a data transfer controller). The data transfer control part 30 controls an image data transfer between the DRAM 22 and the SRAM 24. More specifically, the data transfer control part 30 can control a process in which the image data stored in the DRAM 22 is read out and written into the SRAM 24. The data transfer control part 30 can also control a process in which the image data stored in the SRAM 24 is read out and written into the DRAM 22.

The display controller 20 supplies the image data written in the DRAM 22 or the image data stored in the SRAM 24 by the data transfer control part 30 to the display driver 50. In order to realize this function, the display controller 20 has a LCD interface (I/F) circuit 38 (a display driver interface in a broad sense).

The LCD I/F circuit 38 outputs the image data read out from the DRAM 22 and the SRAM 24 to the display driver 50. The LCD I/F circuit 38 performs an interface process (transmission process to the display driver and buffering of signals) of the image data. The LCD I/F circuit 38 then outputs the image data after the interface process to the display driver 50. The LCD I/F circuit 38 includes a synchronizing signal generation circuit (not shown in the figure). The synchronizing signal generation circuit generates synchronizing signals (a vertical synchronizing signal (VSYNC), a horizontal synchronizing signal (HSYNC), a dot clock (DCLK) and the like) for driving the display panel 60. The LCD I/F circuit 38 can supplies these synchronizing signals to the display driver 50.

Whereas such display controller 20, the host 10 can write the image data in the DRAM 22 and read out the image data from the DRAM 22. The host 10 can also write the image data in the SRAM 24 and read out the image data from the SRAM 24. In order to realize this function, the display controller 20 includes a host I/F circuit 32 (a host interface in a broad sense), a DRAM controller 34 and a SRAM controller 36. An image data inputted from the host 10 though the host I/F circuit 32 is written into the DRAM 22 by the DRAM controller 34. The image data inputted from the host 10 though the host I/F circuit 32 is also written into the SRAM 24 by the SRAM controller 36.

A motion image data or a static image data (an image data) from the host 10 is inputted to the host I/F circuit 32. At this time, the host I/F circuit 32 performs an interface process (data reception process from the host and buffering of signals). The image data after the interface process is supplied to the DRAM controller 34 or the SRAM controller 36. The image data read out from the DRAM 22 by the DRAM controller 34 and the image data read out from the SRAM 24 by the SRAM controller 36 are supplied to the host 10 through the host I/F circuit 32. In this case, the host I/F circuit 32 performs an interface process (transmission process to the host and buffering of signals). The host I/F circuit 32 then outputs the image data after the interface process to the host 10.

The DRAM controller 34 assigns a write address of the DRAM 22 and can control writing of the image data from the host 10. The DRAM controller 34 also assigns a read address of the DRAM 22 and can control reading of the image data from the DRAM 22.

The SRAM controller 36 assigns a write address of the SRAM 24 and can control writing of the image data from the host 10. The SRAM controller 36 assigns a read address of the SRAM 24 and can also control reading of the image data from the SRAM 24.

The display controller 20 further includes a control register 40. The host 10 can set a control data (control information) in the control register 40 through the host I/F circuit 32. An unshown control part in the display controller 20 controls each part of the display controller 20 based on the control data in the control register 40.

Here, the embodiment will be explained by comparison with a comparative example.

Figure 3:
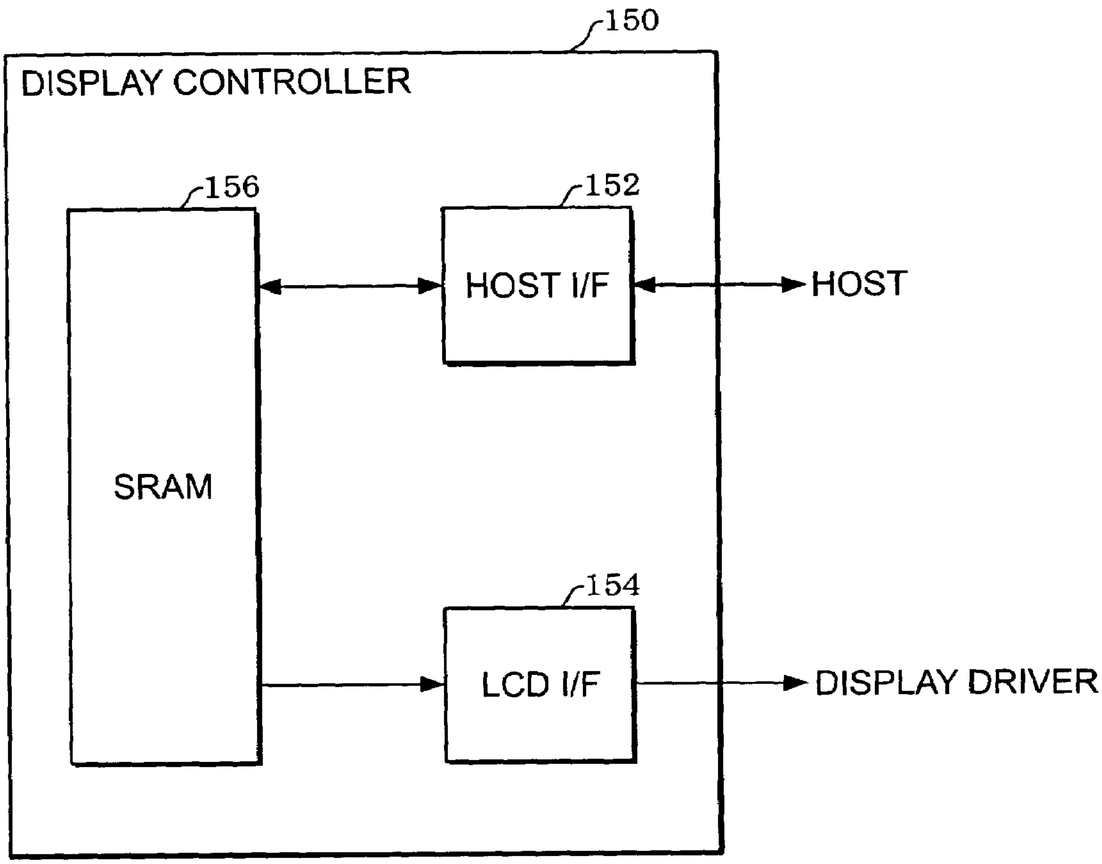
FIG. 3 is a block diagram showing a structure of a display controller of a comparative example according to the embodiment.

FIG. 3 is a block diagram schematically showing a structure of a display controller of the comparative example according to the embodiment of the invention.

A display controller 150 in the comparative example includes a host I/F circuit 152, a LCD I/F circuit 154 and a SRAM 156. In the display controller 150, the image data from the host is stored in the SRAM 156 through the host I/F circuit 152. In the display controller 150, a predetermined image process will be performed to the image dada stored in the SRAM 156. The display controller 150 supplies the image data read out from the SRAM 156 to the display driver through the LCD I/F circuit 154. It is possible to reduce the power consumption with such display controller 150 since it employs the SRAM 156 which uses less power than the DRAM does at the time of the access.

However, the storage capacity of the SRAM 156 in the display controller 150 of the comparative example is not large enough to store the motion image data. For this reason, when a motion image data with a large data size is stored in the SRAM 156, the motion image data has to be repeatedly written into the SRAM 156. As a result, a load of the motion image data writing process (transfer process) of the host increases and the motion image data writing process could be delayed. This leads to deterioration of the motion image quality.

In order to deal with such problem, the display controller 20 of the embodiment has the DRAM 22 and decreases a frequency of access from the host. This makes it possible to reduce the loads of a large size image data writing process (transfer process) such as the motion image data. Furthermore, it is possible to prevent the image quality from being deteriorated, which is caused by the delay of the motion image data writing process and the like, since a plurality of frames worth of motion image data can be written into the DRAM 22, for example. Therefore, a smooth motion picture can be shown.

The display controller 20 of the embodiment can make the SRAM 24 store at least one frame (for example, one frame or two frames) worth of static image data which has a small data size. The storage capacity of the SRAM 24 is enough for the static image data since the static image data has a relatively small data size compared with that of the motion image data. In addition, the power consumption is small at the time of access to supply the data to the display driver and it is possible to realize the low power consumption. For example, when the static image data is supplied to a display driver that does not have a display memory, it is necessary to access the SRAM 24 at a predetermined display frequency. In this case, the above-described low power consumption advantage especially becomes prominent according to the embodiment.

Moreover, in this embodiment, the image data stored in the DRAM 22 is once transferred to the SRAM 24 and a rewriting process (image processing) is performed. The image data after the rewriting process is then rewritten in the SRAM 24. Again the image data is read out from the SRAM 24 and rewritten in the DRAM 22. In this way, it can prevent that a processing time for the rewriting becomes long, which is caused by the long access time of the DRAM 22 at the time of random access. This respect is now described in detail below.

Figure 4:
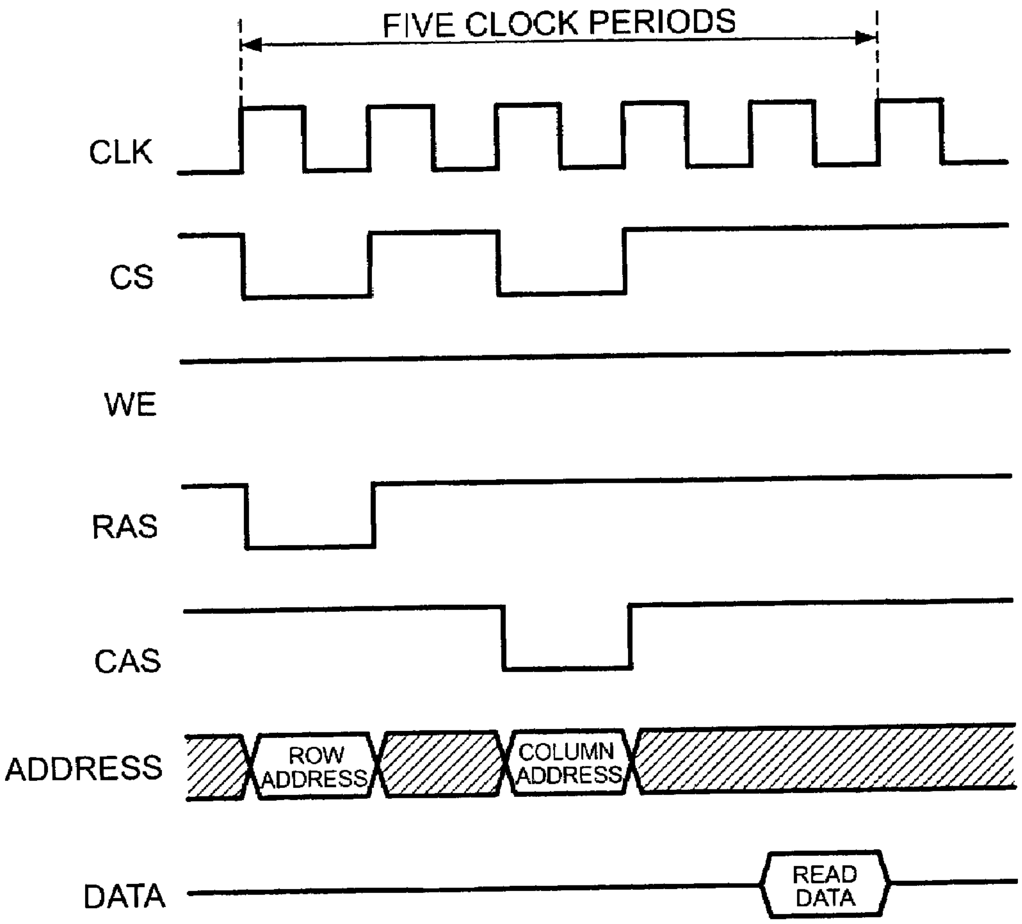
FIG. 4 is an explanatory drawing showing an example of an access timing of a DRAM.

FIG. 4 shows an example of a random access timing of the DRAM 22. In FIG. 4, an example of a reading timing at the time of the random access is shown.

For example, after making a chip select signal SC active and taking a raw address in with a raw address strobe signal RAS, the chip select signal SC is activated again and a column address is taken in with a column address strobe signal CAS. The data in a storage area specified by the raw address and the column address is outputted from the DRAM 22. In a case shown in FIG. 4, a read access time is 5 clock periods.

Figure 5:
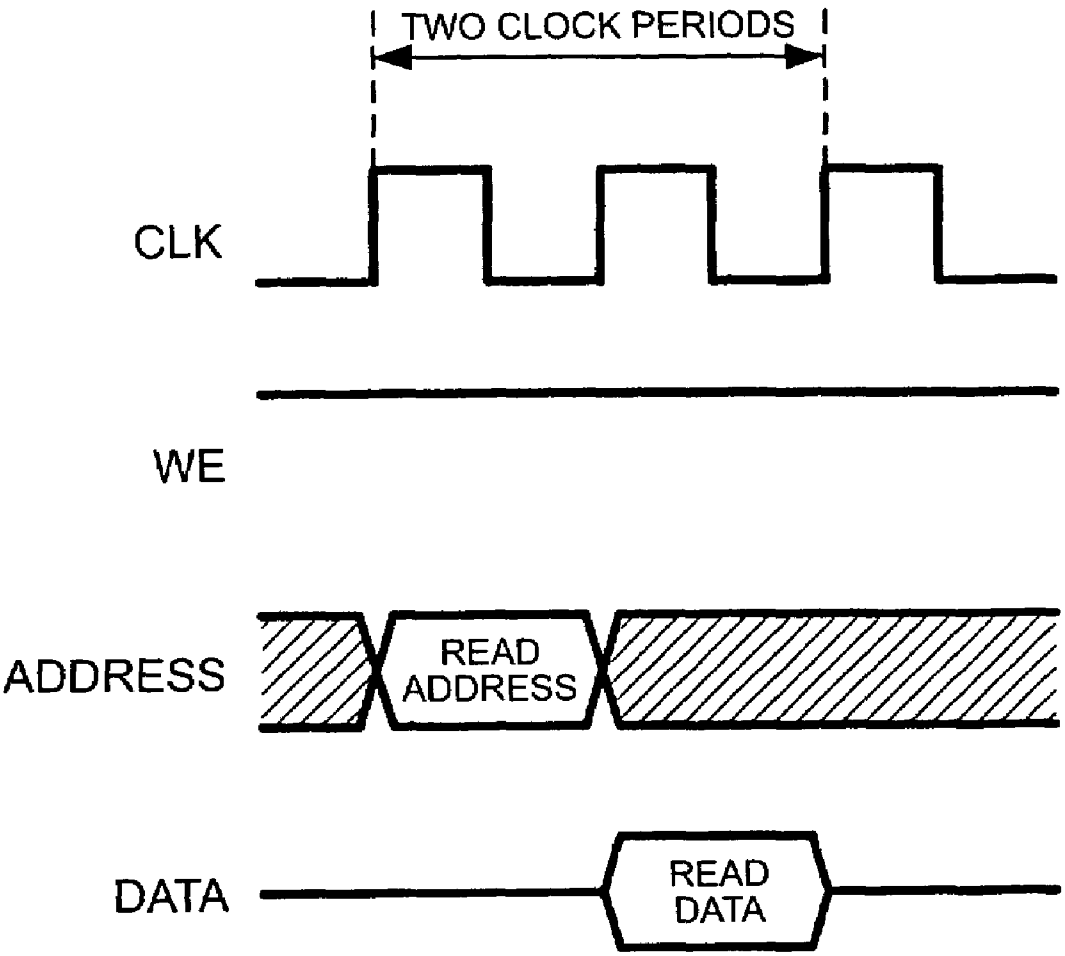
FIG. 5 is an explanatory drawing showing an example of an access timing of a DRAM.

FIG. 5 shows an example of a random access timing of the SRAM 24. In FIG. 5, an example of the reading timing at the time of the random access is shown.

For example, when the read address is specified, a read data is read out from the SRAM 24 at the next clock period. In a case shown in FIG. 5, the read access time is 2 clock periods.

As described above, the DRAM 22 takes a longer time to read out one read data than the SRAM 24 dose. Therefore, the access time of the random access in which the access address is irregular becomes longer than the access time of the SRAM 24.

However, the DRAM 22 can access sequential data at a high speed by an access operation generally called a high-speed column access operation. In the high-speed column access operation, sequential column addresses are specified while the raw address is fixed. This high-speed column access operation can also be referred as a sequential access in a broad sense.

Figure 6:
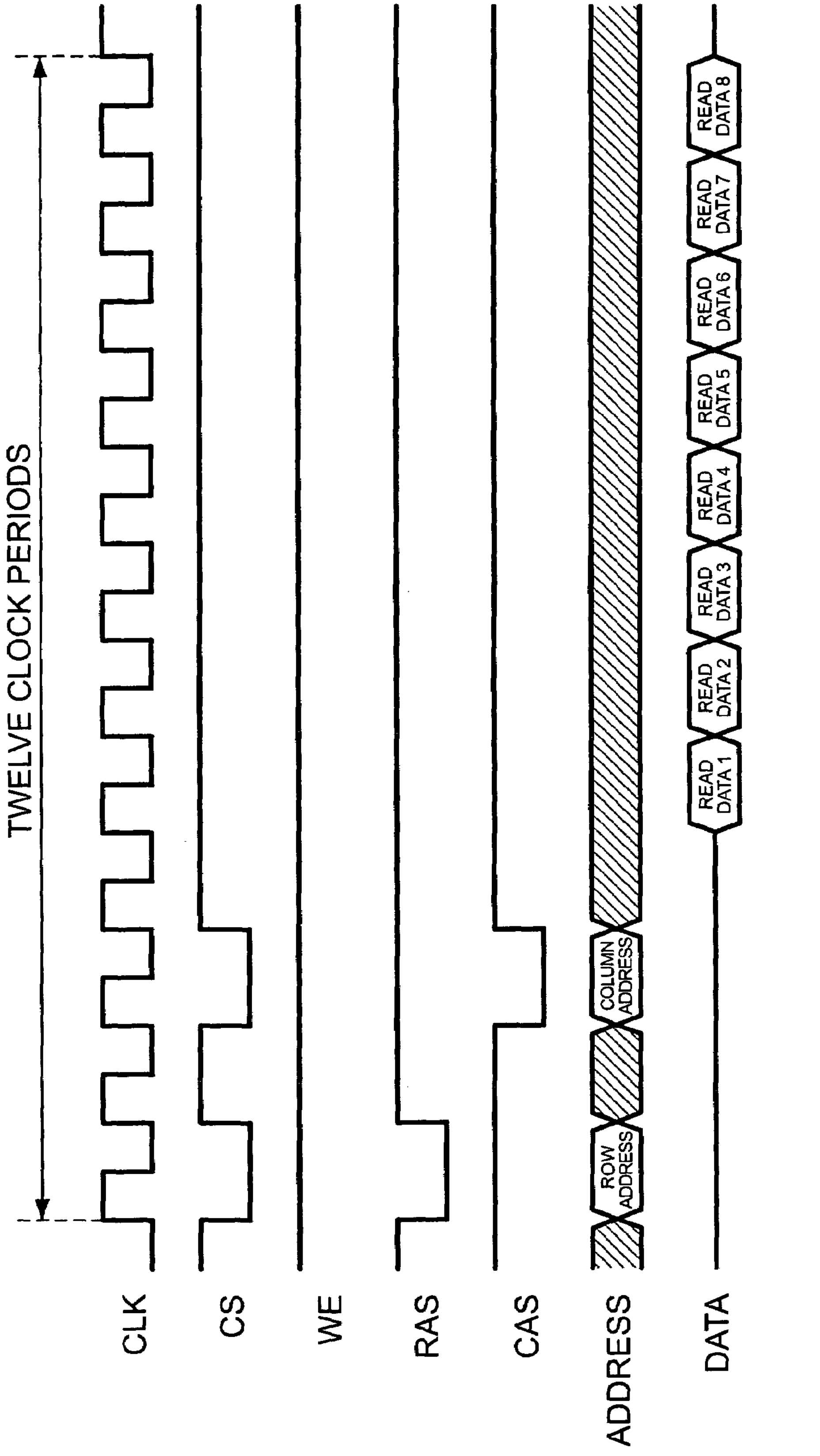
FIG. 6 is an explanatory drawing showing an access timing example of a high-speed column access operation of the DRAM.

FIG. 6 shows a timing example of the high-speed column access operation of the DRAM 22. In FIG. 6, an example of a reading timing of the high-speed column access operation is shown.

For example, after making the chip select signal SC active and taking the raw address in with the raw address strobe signal RAS, the chip select signal SC is activated again and the column address is taken in with the column address strobe signal CAS. The data in the storage area specified by the raw address and the column address is outputted from the DRAM 22. The column address is then sequentially incremented in the DRAM 22. Every time the column address is incremented, the read data which correspond to the row address and the incremented column address are outputted. This can be carried out by, for example, the following procedures. A word line specified by the row address is selected. All memory cells coupled to the selected word line are amplified by a sense amplifier and are read out to a data output line. The data specified by the column address is then sequentially taken out. In the case shown in FIG. 6, a read access time for eight sets of data is 12 clock periods. When the sequential data are accessed, the access time of one read data can be shortened.

Though the reading timing is described in FIG. 6, the above-mentioned process can also be applied to the writing timing.

In this way, the DRAM 22 can be referred as a memory which is accessed with a sequential access operation having a shorter access time per predetermined data unit than that of the random access operation.

The display controller 20 according to the embodiment can set a setting, such as whether the high-speed column access operation is performed to the DRAM 22 or not, the number of increments and the like, in an unshown control register of the control register 40. The DRAM controller 34 conducts the above-described high-speed column access operation according to the setting of the control register and a command from the data transfer control part 30. For this reason, the data transfer control part 30 can perform a burst transfer control to the DRAM controller 34.

When the random access is conducted while the image data stored in the DRAM 22 is directly rewritten, not only the access time becomes longer but also the power consumption increases as described above. Thereby, in this embodiment, the image data stored in the DRAM 22 is once transferred to the SRAM 24 and the rewriting process (image processing) is performed. Then, the image data after the rewriting process is stored in the SRAM 24 and the data is further rewritten into the DRAM 22 from the SRAM 24.

Figure 7:
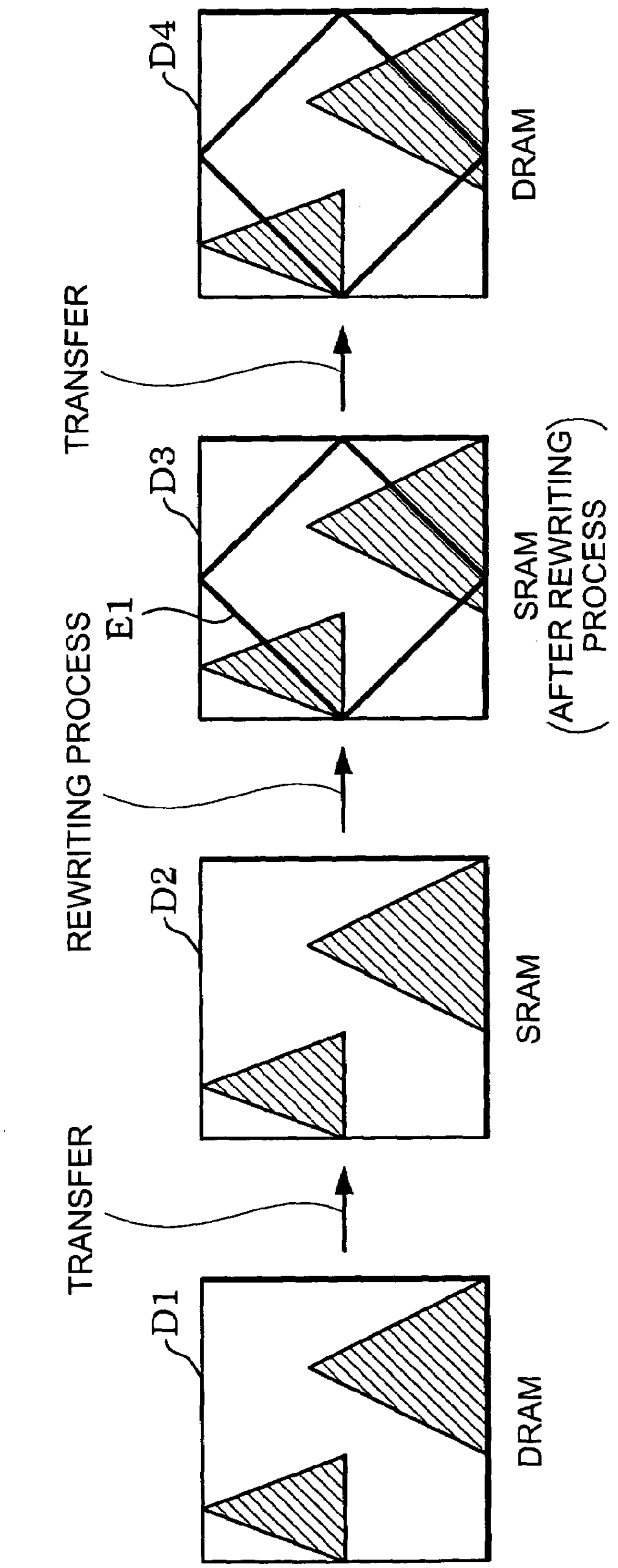
FIG. 7 is an explanatory drawing showing an operation of the display controller according to the embodiment.

FIG. 7 is an explanatory drawing schematically showing an operation of the data transfer control part 30 according to the embodiment of the invention.

Assume that an image data of a display image D1 is stored in the DRAM 22. The data transfer control part 30 reads out the image data of the display image D1 from the DRAM 22 and controls the image data to be written into the SRAM 24. Accordingly, an image data of a display image D2 is stored in the SRAM 24.

The host 10 then reads out the image data from the SRAM 24 through the host I/F circuit 32 and performs the rewriting process. Here, the host 10 rewrites the image so as to composite a display image E1 and produces an image data of a display image D3. The host 10 again writes the image data of the display image D3 after the rewriting process into the SRAM 24 through the host I/F circuit 32. In this case, the image data is read out by the random access of the host 10 to the SRAM 24. Therefore, it is possible to shorten the access time and reduce the power consumption at the time of the access compared with a case where the host 10 performs the random access to the DRAM 22.

Next, the data transfer control part 30 reads out the image data of the display image D3 from the SRAM 24 and performs a control in order to write the image data into the DRAM 22. Accordingly, an image data of a display image D4 is stored in the DRAM 22.

In this way, it is possible to shorten the access time of the random access to the image data which is going to be rewritten according to the embodiment. In addition, it is possible to reduce the power consumption at the time of the access by the random access to the SRAM 24 compared with the case of the random access to the DRAM 22.

In this embodiment, it is preferred that the data transfer control part 30 can conduct a key color process. In other words, the data transfer control part 30 receives the image data read out from an RAM which is a source. But the data transfer control part 30 preferably does not transfer an image data of a pixel which corresponds to a predetermined pixel value but holds the forwarding image data. The data transfer control part 30 then superposes (composites) the images of the two image data. To do this, the control register 40 includes a first key color register 42 in this embodiment. A first color data of the pixel is set in the first key color register 42 as a key color. The data transfer control part 30 performs the writing control in the SRAM 24 only to image data which are read out from the DRAM 22 and whose pixel values do not correspond to a first key color data. In this way, it is possible to simply perform the image composition process.

Figure 8:
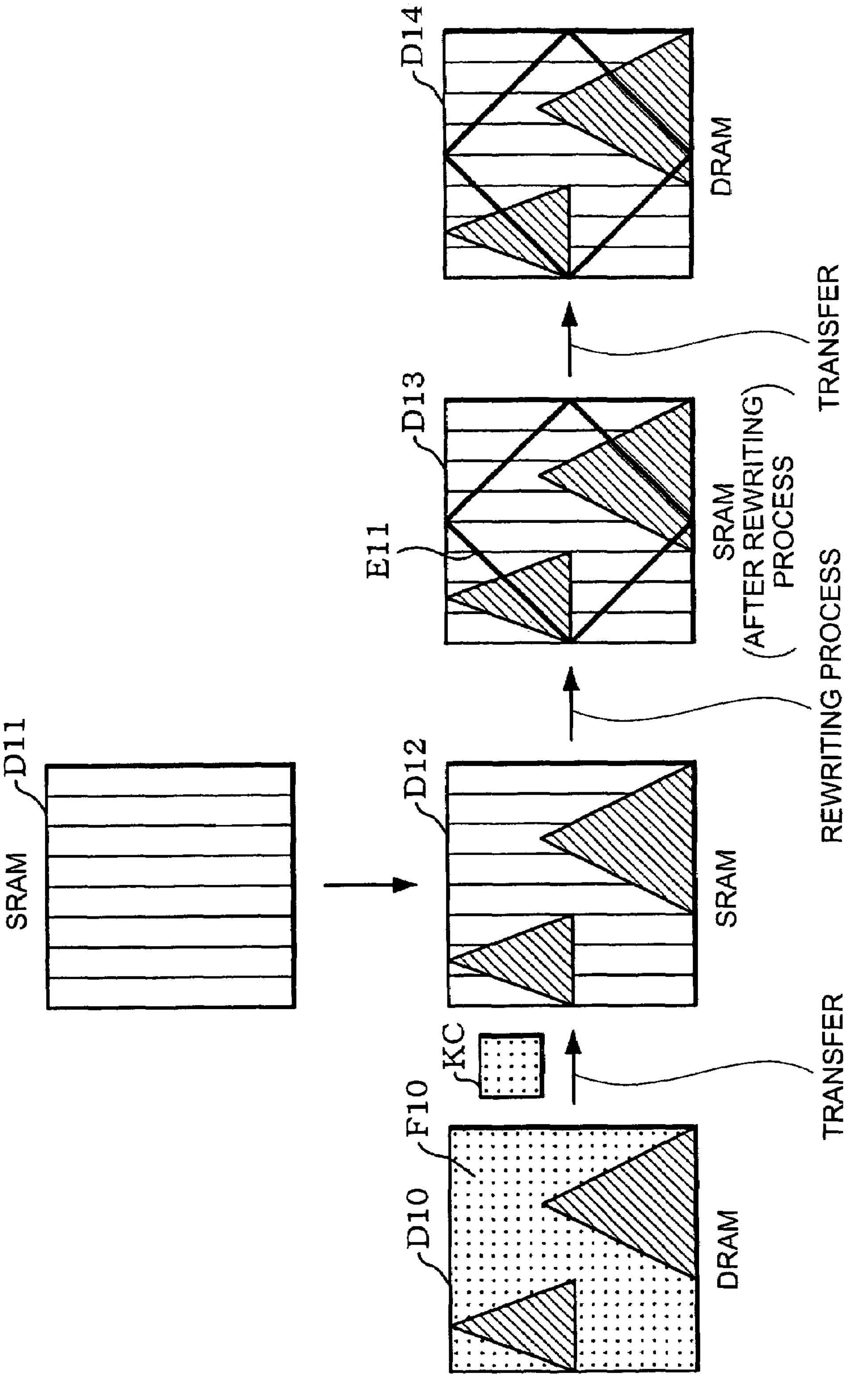
FIG. 8 is an explanatory drawing of a key color process in the embodiment.

FIG. 8 is an explanatory drawing for the key color process in the embodiment.

Assume that an image data of a display image D10 is stored in the DRAM 22 and an image data of a display image D11 is stored in the SRAM 24. Also assume that a first key color data KC which is identical with a pixel value of a pixel in a background part F10 of the display image D10 is stored in the first key color register 42.

The data transfer control part 30 reads out the image data of the display image D10 from the DRAM 22 and performs a control so as to write the image data into the SRAM 24. At this time, the pixel value of the pixel in the background part F10 of the display image D10 is identical with the first key color data KC. Therefore, the data transfer control part 30 does not perform the writing control to the image data of the pixel having the pixel value of the background part F20 of the display image D10 to be written in the SRAM 24. As a result, an image data of a display image D12 is stored in the SRAM 24.

The host 10 then reads out the image data from the SRAM 24 through the host I/F circuit 32 and performs the rewriting process. Here, the host 10 rewrites the image so as to composite a display image E11 and produces an image data of a display image D13. The host 10 again writes the image data of the display image D13 after the rewriting process into the SRAM 24 through the host I/F circuit 32.

Next, the data transfer control part 30 reads out the image data of the display image D13 from the SRAM 24 and performs a control in order to write the image data into the DRAM 22. Accordingly, an image data of a display image D14 is stored in the DRAM 22.

In this way, it is possible to easily compose the image of the display image D11 and the image of the display image stored in the DRAM 22 as making the image of the display image D11 stored in the SRAM 24 in advance as the background image.

Detailed configuration example of the display controller 20 according to the above-described embodiment will now be described.

Firstly, a configuration example of the control register 40 in the display controller 20 shown in FIG. 2 is described.

Figure 9:
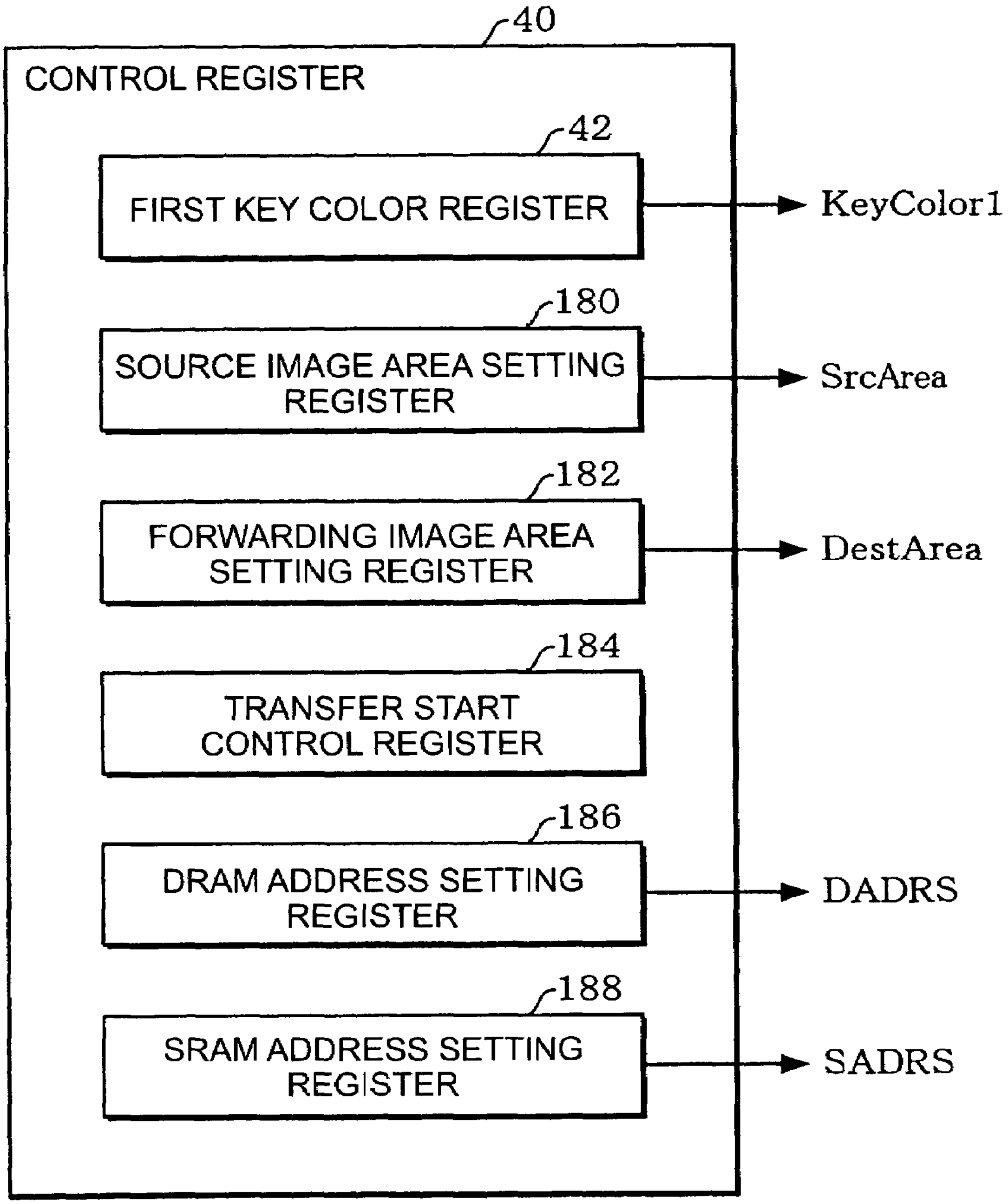
FIG. 9 is a block diagram showing a configuration example of a control register shown in FIG. 2.

FIG. 9 shows the configuration example of the control register 40 in the display controller 20 shown in FIG. 2. Control information is set in each register included in the control register 40 through the host I/F circuit 32 by the host.

As described above, the first key color data of the pixel is set in the first key color register 42 as the key color. A first key color data KeyColor1 set in the first key color register 42 is outputted to the data transfer control part 30. The data transfer control part 30 performs the key color process by using the first key color data KeyColor1 in the way as described above.

In a source image area setting register180, control information for setting an image area which is read from an RAM (the DRAM 22 or the SRAM 24) that is a source of the transferring is set. The control information set in the source image area setting register 180 is outputted as a source image area setting information SrcArea. The data transfer control part 30 performs the reading control from the DRAM 22 or the SRAM 24 by using the source image area setting information SrcArea.

Figure 10:
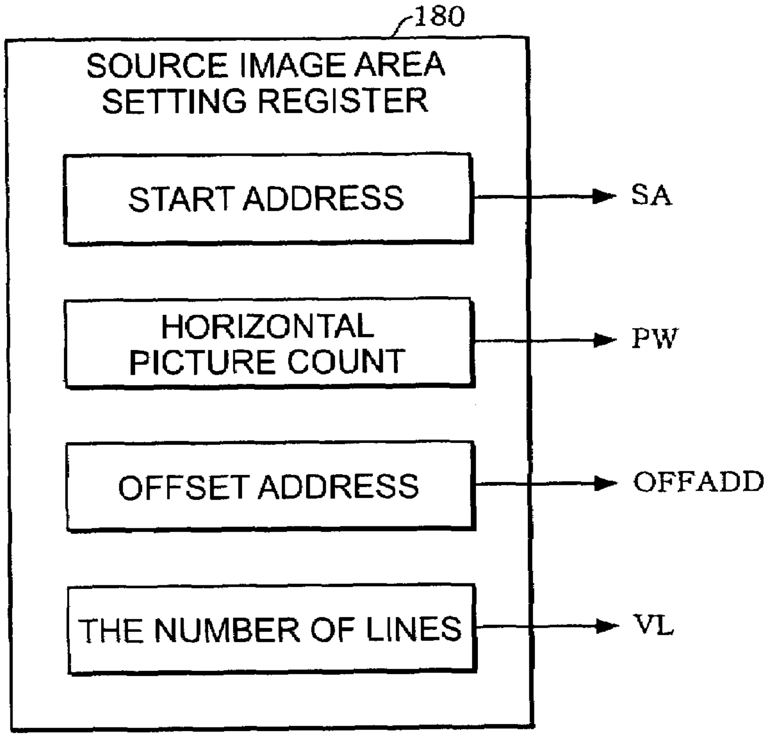
FIG. 10 is a block diagram showing a configuration example of a source image area setting register shown in FIG. 9.

FIG. 10 shows a configuration example of the source image area setting register 180 shown in FIG. 9.

Figure 11:
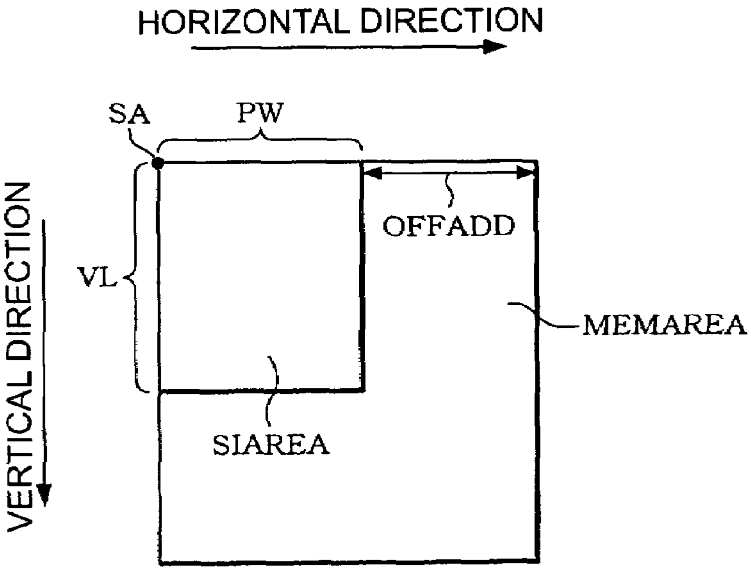
FIG. 11 is an explanatory drawing for the source image area setting register shown in FIG. 10.

FIG. 11 is an explanatory drawing for the setting value of the source image area setting register 180 shown in FIG. 10.

In FIG. 10, a start address SA, a horizontal pixel width PW, an offset address OFFADD and the number of lines VL are set in the source image area setting register 180.

An image data storage area SIAREA of the image data in the source image area is provided in a memory area MEMAREA of the RAM which is the source shown in FIG. 11. In this case, the start address SA is a reading start address for the image data storage area SIAREA of the image data in the source image area. The horizontal pixel width PW is the number of the pixels in the horizontal direction of the image in the source image area. The offset address OFFADD is a differential address between an address (final address) of an image data of the last pixel in a line where the image of the source image area is and an address of an image data of the top pixel in the next line in the vertical direction of the image in the source image area. The number of lines VL is the number of the lines in the vertical direction of the image of the source image area.

Return to FIG. 9 and continue the description. Control information for setting an image area that is written into a forwarding RAM (the SRAM 24 or the DRAM 22) is set in a forwarding image area setting register 182. The control information set in the forwarding image area setting register 182 is outputted as a forwarding image area setting information DestArea. The data transfer control part 30 performs the writing control to the SRAM 24 or the DRAM 22 by using the forwarding image area setting information DestArea. A data size of an image data in an image area specified by the source image area setting information SrcArea is equal to a data size of an image data in an image area specified by the forwarding image area setting information DestArea. The forwarding image area setting register 182 has the same structure as that of the above-described source image area setting register 180.

A transfer start control register 184 is a register for commanding a start of the data transfer control by the data transfer control part 30. The data transfer control part 30 starts the data transfer control when the host 10 accesses the transfer start control register 184 through the host I/F circuit 32. For example, a transfer direction can be set in the transfer start control register 184 and the data transfer control part 30 starts the data transfer control according to the transfer direction.

A reading start address or a writing start address for the DRAM 22 is set in a DRAM address setting register 186. The address set in the DRAM address setting register 186 is outputted as a DRAM address DADRS. The DRAM controller 34 reads out the image data from the DRAM 22 by using a read address that is renewed based on the DRAM address DADRS. The DRAM controller 34 also writes the image data from the host into the DRAM 22 by using a write address that is renewed based on the DRAM address DADRS. The image data read out from the DRAM 22 is supplied to the host 10 through the host I/F circuit 32 or supplied to the display driver 50 through the LCD I/F circuit 38 together with a synchronizing signal for display.

A reading start address or a writing start address for the SRAM 24 is set in a SRAM address setting register 188. The address set in the SRAM address setting register 188 is outputted as a SRAM address SADRS. The SRAM controller 36 reads out the image data from the SRAM 24 by using a read address that is renewed based on the SRAM address SADRS. The SRAM controller 36 also writes the image data from the host into the SRAM 24 by using a write address that is renewed based on the SRAM address SADRS. The image data read out from the SRAM 24 is supplied to the host 10 through the host I/F circuit 32 or supplied to the display driver 50 through the LCD I/F circuit 38 together with the synchronizing signal for display.

Various control information set in the control register 40 shown in FIG. 9 are outputted to the data transfer control part 30, the DRAM controller 34 and the SRAM controller 36 shown in FIG. 2.

Figure 12:
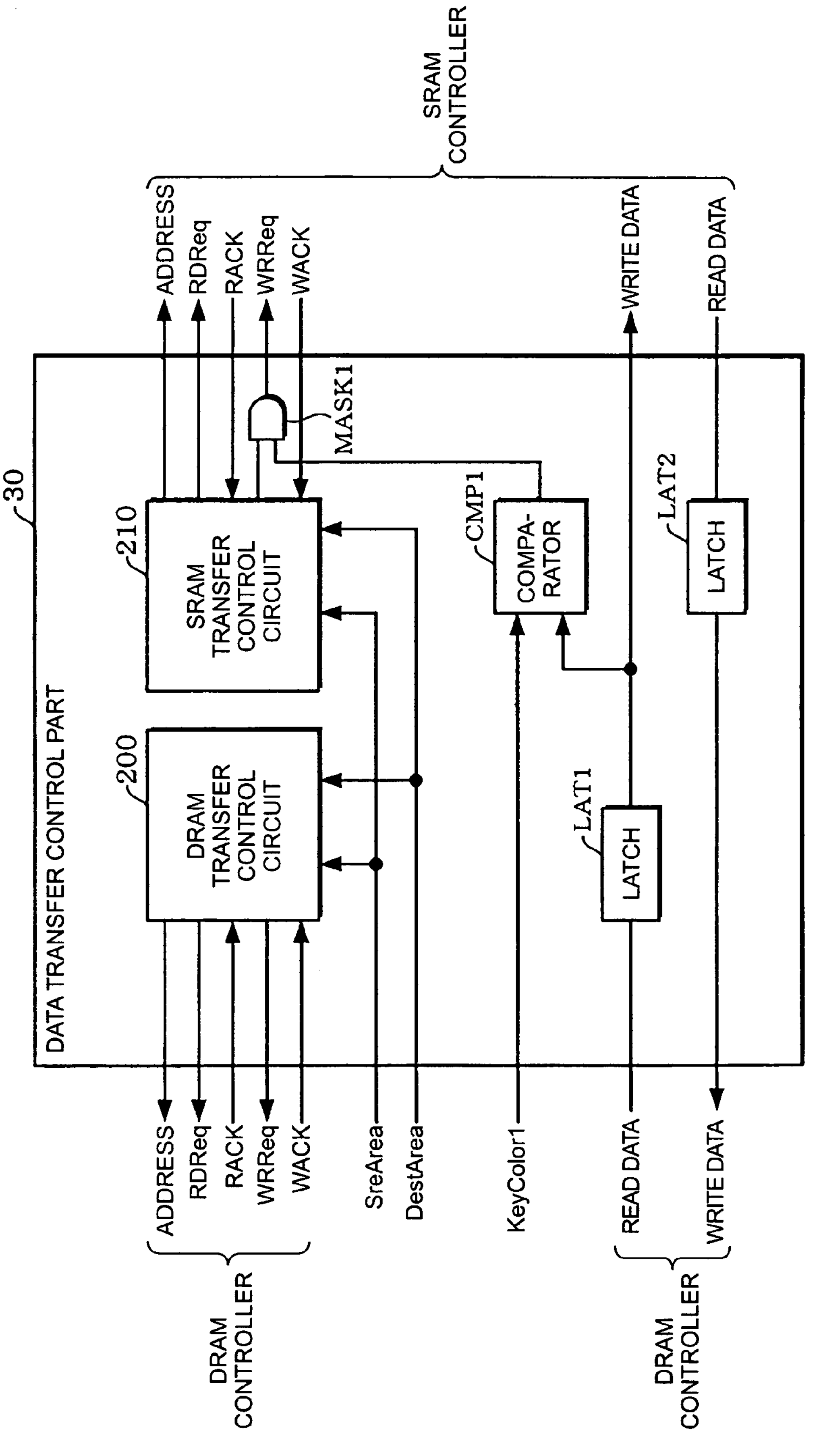
FIG. 12 is a block diagram showing a configuration example of the data transfer control part shown in FIG. 2.

FIG. 12 is a block diagram showing a configuration example of the data transfer control part 30 shown in FIG. 2.

The data transfer control part 30 includes a DRAM transfer control circuit 200, a SRAM transfer control circuit 210, a comparator CMP1, a latch LAT1 and a latch LAT2.

The DRAM transfer control circuit 200 generates an address, a reading request signal RDReq and a writing request signal WRReq based on the source image area setting information SrcArea or the forwarding image area setting information DestArea from the control register 40 and supplies them to the DRAM controller 34. More specifically, the DRAM transfer control circuit 200 sequentially updates the read address specified by the source image area setting information SrcArea or the write address specified by the forwarding image area setting information DestArea according to the command for the start of transferring. The DRAM transfer control circuit 200 generates a read address for the DRAM controller 34 and the reading request signal RDReq. When the reading operation finishes, the DRAM transfer control circuit 200 is notified of the completion by an acknowledge signal RACK from the DRAM controller 34. The DRAM transfer control circuit 200 also generates a write address for the DRAM controller 34 and the writing request signal WRReq. When the writing operation finishes, the DRAM transfer control circuit 200 is notified of the completion by an acknowledge signal WACK from the DRAM controller 34. The DRAM transfer control circuit 200 performs the reading control and the writing control of the image data by pixels. Such DRAM transfer control circuit 200 specifies the burst transfer control for the DRAM controller 34 and realizes the high-speed column access operation at the timing shown in FIG. 6.

The SRAM transfer control circuit 210 generates the address, the reading request signal RDReq and the writing request signal WRReq based on the source image area setting information SrcArea or the forwarding image area setting information DestArea from the control register 40 and supplies them to the SRAM controller 36. More specifically, the SRAM transfer control circuit 210 sequentially updates the read address specified by the source image area setting information SrcArea or the write address specified by the forwarding image area setting information DestArea according to the command for the start of transferring. The SRAM transfer control circuit 210 generates a read address for the SRAM controller 36 and the reading request signal RDReq. When the reading operation finishes, the SRAM transfer control circuit 210 is notified of the completion by the acknowledge signal RACK from the SRAM controller 36. The SRAM transfer control circuit 210 also generates a write address for the SRAM controller 36 and the writing request signal WRReq. When the writing operation finishes, the SRAM transfer control circuit 210 is notified of the completion by the acknowledge signal WACK from the SRAM controller 36. The SRAM transfer control circuit 210 performs the reading control and the writing control of the image data by pixels.

The writing request signal WRReq (a writing control signal for writing the pixel of the image data read out from the DRAM 22 into the SRAM 24) outputted from the SRAM transfer control circuit 210 is mask-controlled by a mask circuit MASK1.

The read data that is read out from the DRAM 22 by pixels and controlled to be read by the DRAM transfer control circuit 200 is temporarily stored by the latch LAT1 and then supplied to the SRAM 24 as the write data. At this time, the writing control to the SRAM 24 is performed by the SRAM transfer control circuit 210.

The read data that is read out from the SRAM 24 by pixels and controlled to be read by the SRAM transfer control circuit 200 is temporarily stored by the latch LAT2 and then supplied to the DRAM 22 as the write data. At this time, the writing control to the DRAM 22 is performed by the DRAM transfer control circuit 210.

The comparator CMP1 compares the first key color data KeyColor1 set in the first key color register 42 with the image data of the pixel stored in the latch LAT1. Output of the comparator CMP1 becomes a low (L) level when these data are identical while the output of the comparator CMP1 becomes a high (H) level when these data are not identical. Therefore, the mask circuit MASK 1 masks the writing control in order to prevent the image data of the pixel corresponding to the first key color data KeyColor1 from being written into the SRAM 24. Accordingly, the data transfer control part 30 can only perform the writing control for writing the image data of the pixel corresponding to the first key color data KeyColor1 into the SRAM 24.

Figure 13:
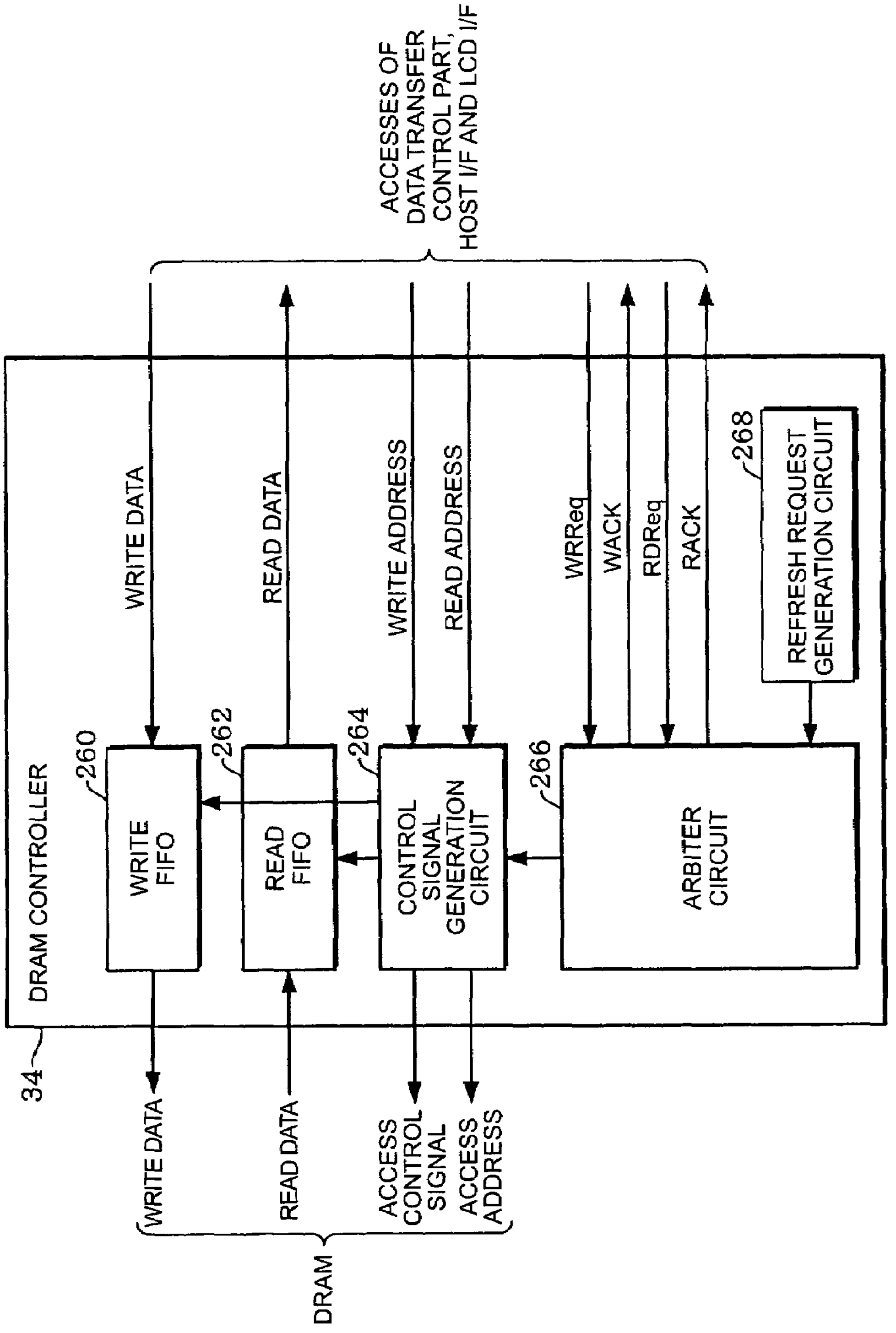
FIG. 13 is a block diagram showing a configuration example of a DRAM controller shown in FIG. 2.

FIG. 13 shows a configuration example of the DRAM controller 34 shown in FIG. 2.

The DRAM controller 34 includes a write FIFO 260, a read FIFO 262, a control signal generation circuit 264, an arbiter circuit 266 and a refresh request generation circuit 268.

The write FIFO 260 accumulates the image data from the host through the host I/F circuit 32 and sequentially outputs the write data to the DRAM 22 at the timing specified by the control signal generation circuit 264. The read FIFO 262 accumulates the read data from the DRAM 22 and sequentially outputs the read data to the host I/F circuit 32, the LCD I/F circuit 38 and the data transfer control part 30 at the timing specified by the control signal generation circuit 264.

The control signal generation circuit 264 generates a control signal and an address for performing the writing operation or the reading operation to the DRAM 22 based on a read address or write address for transferring sent from the DRAM transfer control circuit 200, a write address for writing or a read address for displaying sent from an unshown control part and a result of arbitration by the arbiter circuit 266. As such control signal, there are the chip select signal CS, a write enable signal WE, the raw address strobe signal RAS, the column address strobe signal CAS and the like as shown in FIG. 4 or FIG. 6.

The arbiter circuit 266 arbitrates a writing request, a reading request from the DRAM transfer control circuit 200 or an unshown control part and a refresh request from the refresh request generation circuit 268. The arbiter circuit 266 notifies the control signal generation circuit 264 of the arbitration result and notifies the completion of the access for the request signal by the acknowledge signals WACK and RACK.

The refresh request generation circuit 268 generates the refresh request in a refresh period of the DRAM 22 and sends it to the arbiter circuit 266.

Figure 14:
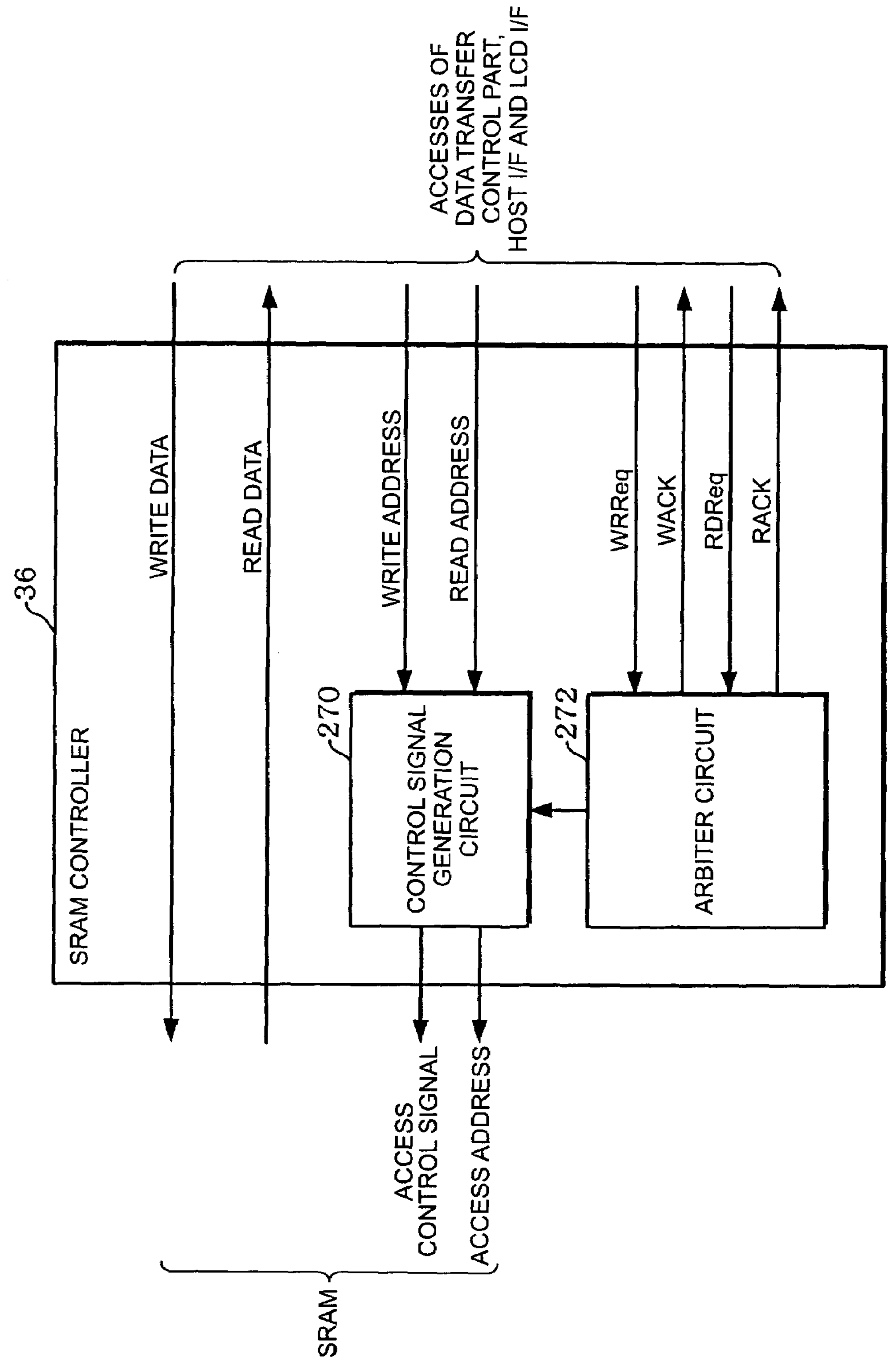
FIG. 14 is a block diagram showing a configuration example of a SRAM controller shown in FIG. 2.

FIG. 14 shows a configuration example of the SRAM controller 36 shown in FIG. 2.

The SRAM controller 36 includes a control signal generation circuit 270 and an arbiter circuit 272.

The control signal generation circuit 270 generates a control signal and an address for performing the writing operation or the reading operation to the SRAM 24 based on a read address or write address for transferring that is sent from the SRAM transfer control circuit 210, a write address for writing or a read address for displaying sent from the unshown control part and a result of arbitration by the arbiter circuit 272. As such control signal, there is the write enable signal WE shown in FIG. 5 and the like.

The arbiter circuit 272 arbitrates a writing request and a reading request from the SRAM transfer control circuit 210 or the unshown control part. The arbiter circuit 272 notifies the control signal generation circuit 270 of the arbitration result and notifies the completion of the access for the request signal by the acknowledge signals WACK and RACK.

As described above, the data transfer control part 30 conducts the data transfer control in which the DRAM controller 34 accesses the DRAM 22 and the SRAM controller 36 accesses the SRAM 24. In the unshown control part, the DRAM controller 34 accesses the DRAM 22 and the SRAM controller 36 accesses the SRAM 24. Then, the unshown control part controls the output of the image data to the display driver through the LCD I/F circuit 38. The unshown control part also controls the writing and the reading to and from the host through the host I/F circuit 32.

Figure 15:
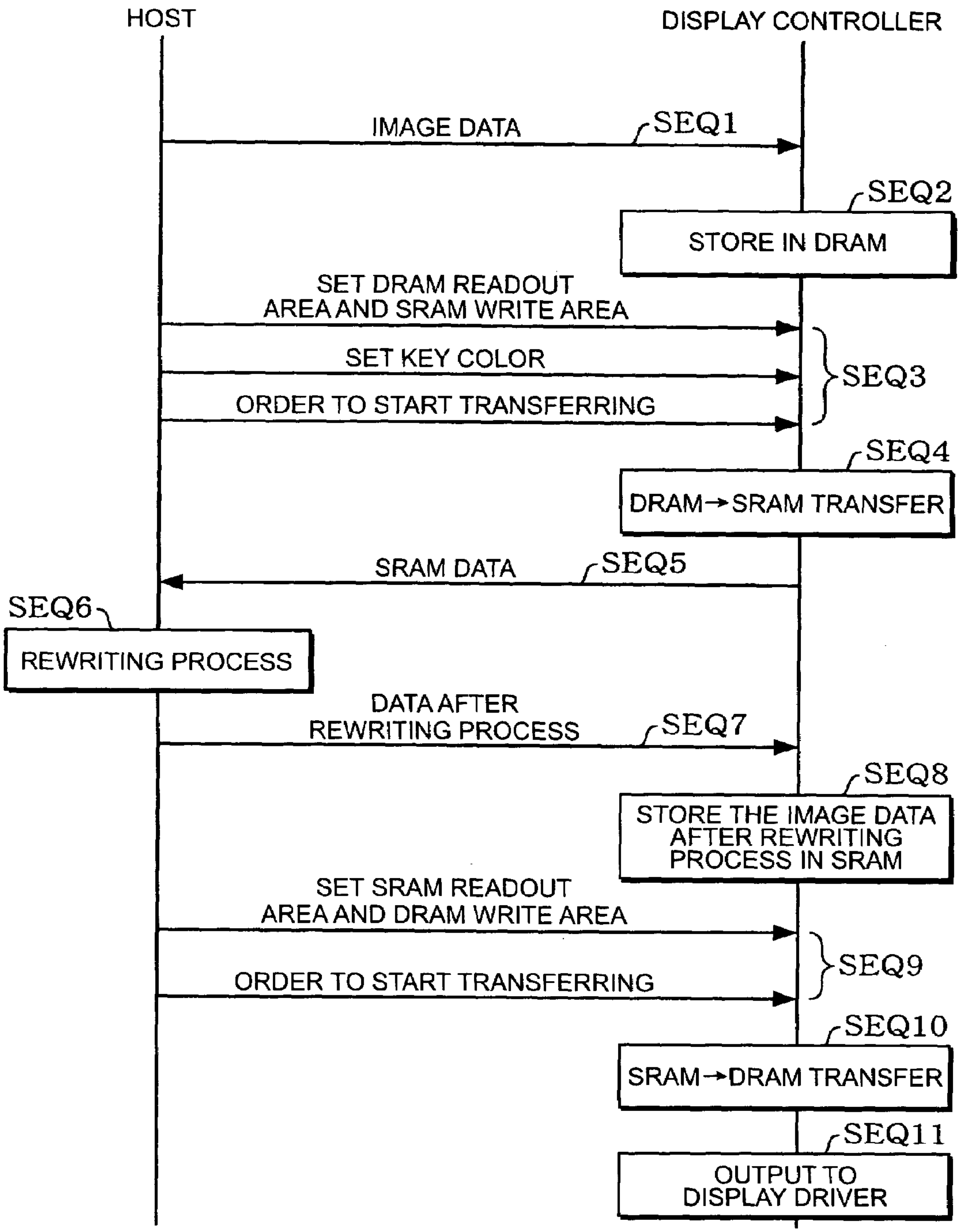
FIG. 15 shows an example of an operation sequence of the display controller and a host according to the embodiment.

FIG. 15 shows an example of an operation sequence of the display controller 20 and the host 10 according to the embodiment.

Firstly, the host 10 supplies an image data through the host I/F circuit 32 in the display controller 20 (SEQ1). In the display controller 20, the DRAM controller 34 writes the image data from the host into a storage area of the DRAM 22 which is specified by the DRAM address DADRS set in the DRAM address setting register 186 (SEQ2).

The host 10 then sets a readout area of the DRAM 22, a write area of the SRAM 24 and the key color (first key color data) in the control register 40 of the display controller 20. The readout area is an image area where the host wants to perform the rewriting process later. The host 10 then accesses the transfer start control register 184 in the control register 40 (SEQ3). By doing this, the data transfer control part 30 reads out the image data in the readout area of the DRAM 22 by the high-speed column access operation and performs the control to sequentially write the image data into the write area of the SRAM 24. In this way, the burst transfer is performed (SEQ4).

Next, the host 10 reads out the image data written in the write area of the SRAM 24 which is set in SEQ3 through the host I/F circuit 32 (SEQ5).

The host 10 performs the rewriting process (image processing in a broad sense) to the image data read out from the SRAM 24 (SEQ6). As such rewriting process, there is an effect process such as an averaging process of pixels, an edge enhancing process, an isolated point removing process and a color tone modifying process.

The host 10 writes the image data that was rewritten in the above-described way into the SRAM 24 once again through the host I/F circuit 32 (SEQ7). As a result, the image data after the rewriting process is stored in the SRAM 24 (SEQ8).

The host 10 then sets a readout area of the SRAM 24 and a write area of the DRAM 22 in the control register 40 in the display controller 20. This readout area of the SRAM 24 can be same as the write area of the SRAM 24 set in SEQ 3 (or the read out area by the host in SEQ5 or the written area in the host in SEQ7). The write area of the DRAM 22 can be same as the read out area of the DRAM 22 set in SEQ 3. The host 10 then accesses the transfer start control register 184 in the control register 40 (SEQ9). By doing this, the data transfer control part 30 reads out the image data in the readout area of the SRAM 24 and performs the control to write the image data into the write area of the DRAM 22 by the high-speed column access operation. In this way, the burst transfer is performed (SEQ10).

After that, in the display controller 20, at least one frame worth of image data including the image data after the rewriting process is read out from the DRAM 22 and supplied to the display driver 50 together with the synchronizing signal through the LCD I/F circuit 38 (SEQ11). In this way, the display driver 50 controls the display of the display panel 60.

2.1 First Modification Example

Though the data transfer control part 30 performs the key color process when the image data is transferred from the DRAM 22 to the SRAM 24 in the above-described embodiment, the present invention is not limited to this.

Besides when the image data is transferred from the DRAM 22 to the SRAM 24, the key color process is also performed when the image data is transferred from the SRAM 24 to the DRAM 22 in a first modification example of the invention.

Figure 16:
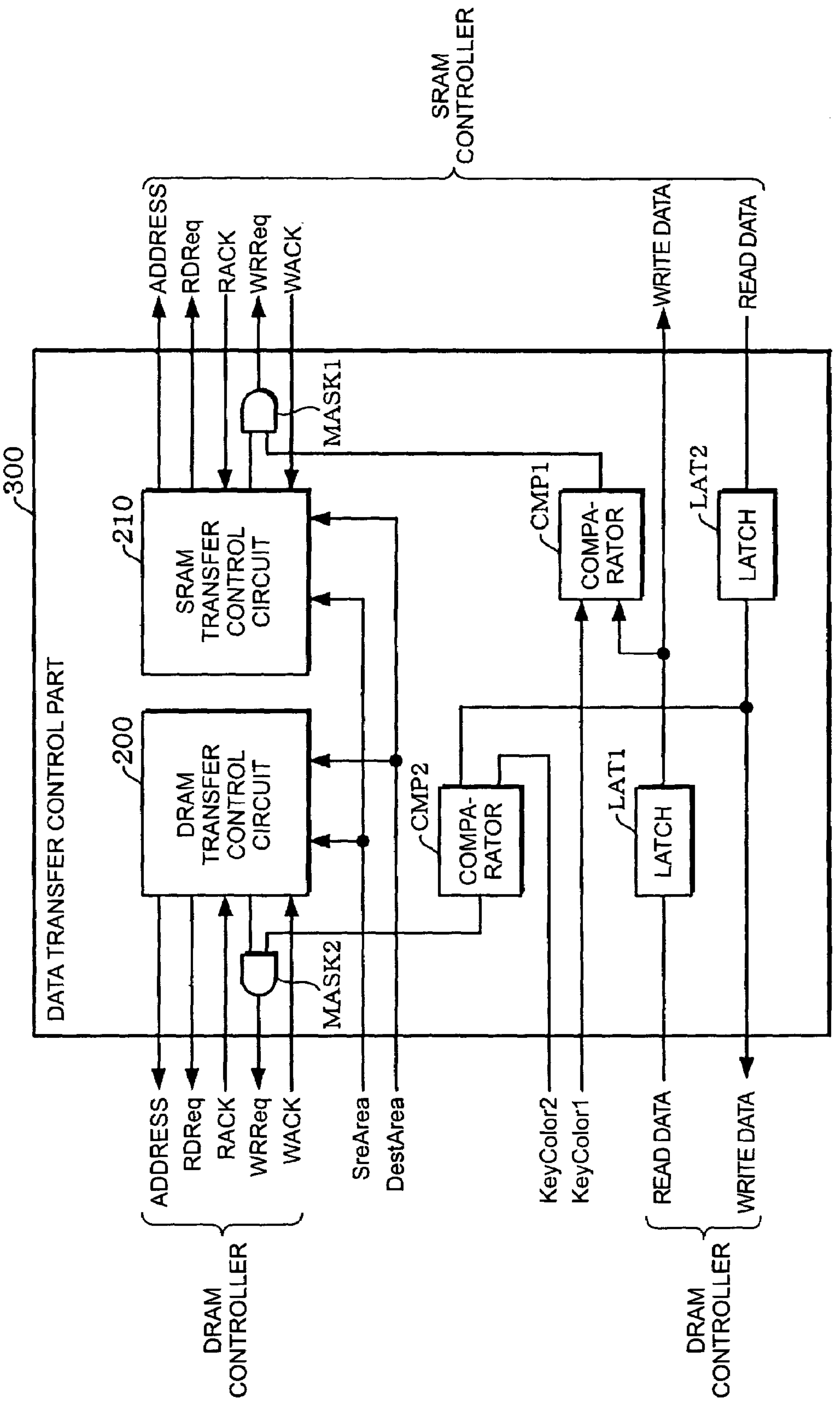
FIG. 16 is a block diagram showing a configuration example of a data transfer control part in a first modification example.

FIG. 16 is a block diagram showing a configuration example of a data transfer control part 300 in the first modification example. The same structures as those of the data transfer control part 30 in the above-described embodiment shown in FIG. 12 are given the identical numerals and those explanations will be omitted.

In the data transfer control part 300 shown in FIG. 16, a comparator CMP2 and a mask circuit MSK2 are added to the data transfer control part 30 shown in FIG. 12. A second key color is provided in the control register 40 as the key color of the pixel at the time of transferring the image data from the SRAM 24 to the DRAM 22 in the first modification example. A second key color data KeyColor2 which is a setting value of a second key color register is inputted in the comparator CMP2.

In the first modification example, a writing request signal WRReq (a writing control signal for writing the pixel of the image data read out from the SRAM 24 into the DRAM 22) outputted from the DRAM transfer control circuit 200 is mask-controlled by the mask circuit MASK2.

The comparator CMP2 compares the second key color data KeyColor2 set in the second key color register with an image data of the pixel stored in the latch LAT2. Output of the comparator CMP2 becomes the low (L) level when these data are identical while the output of the comparator CMP2 becomes the high (H) level when these data are not identical. Therefore, the mask circuit MASK 2 masks the writing control in order to prevent the image data of the pixel corresponding to the second key color data KeyColor2 from being written into the DRAM 22. Accordingly, the data transfer control part 300 can only perform the writing control to write the image data of the pixel corresponding to the second key color data KeyColor2 into the DRAM 22.

Other parts of the display controller of the first modification example are the same as those of the display controller 20 in the above-described embodiment. Therefore, those descriptions will be omitted. According to the first modification example, it is possible to simply realize the image composition process in the same way as the case described with reference to FIG. 8.

Note that the present invention is not limited to the above-described embodiment or the first modification example. The key color process may be performed only when the image data is transferred from the SRAM 24 to the DRAM 22. It is obvious that the display controller in the first modification example may be applied to the display system shown in FIG. 1.

2.2 Second Modification Example

Though the host reads out the image data after the data transfer controlled by the data transfer part from the SRAM 24 and performs the rewriting process in the above-described embodiment and the first modification example, the invention is not limited to this. In a second modification example of the present invention, the display controller includes an image processing part 360 which performs the rewriting process (for example, the effect processes such as the averaging process of pixels, the edge enhancing process, the isolated point removing process and the color tone modifying process) instead of the host in the above-described embodiment and the first modification example. This rewriting process can be referred as the image processing in a broad sense.

Figure 17:
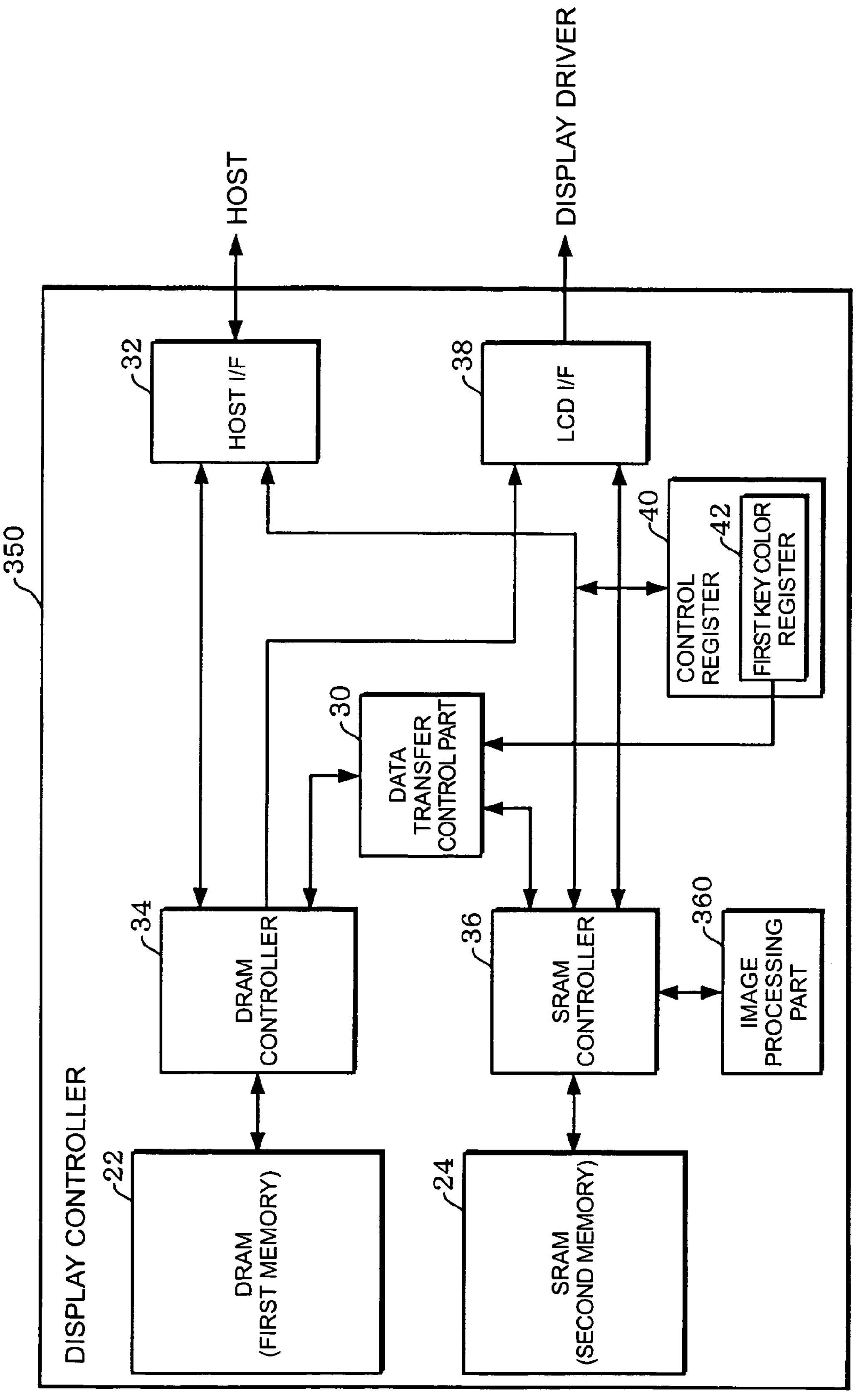
FIG. 17 is a block diagram showing a configuration example of a display controller in a second modification example.

FIG. 17 is a block diagram showing a configuration example of a display controller in the second modification example. The same structures as those of the display controller 20 in the above-described embodiment shown in FIG. 2 are given the identical numerals and those explanations will be omitted.

A display controller 350 in the second modification example has the image processing part 360 in addition to the display controller in the above-described embodiment and the first modification example. This image processing part 360 can perform the effect processes such as the averaging process of pixels, the edge enhancing process, the isolated point removing process and the color tone modifying process as the rewriting process of the image data stored in the SRAM 24.

In the second modification example, the image processing part 360 requests the SRAM controller 36 for reading the image data of the pixel in the image area to which the writing process is performed from the SRAM 24. The image processing part 360 also requests the SRAM controller 36 for rewriting the image data after the rewriting process into the SRAM 24. When the image data is rewritten into the SRAM 24, it is preferred that the image data is rewritten in the read area of the rewriting process.

Such process of the image processing part 360 may be started by a command from the host 10 or the image processing part 360 may start the process itself when it receives the completion notice of the data transfer control from the data transfer control part 30.

Figure 18:
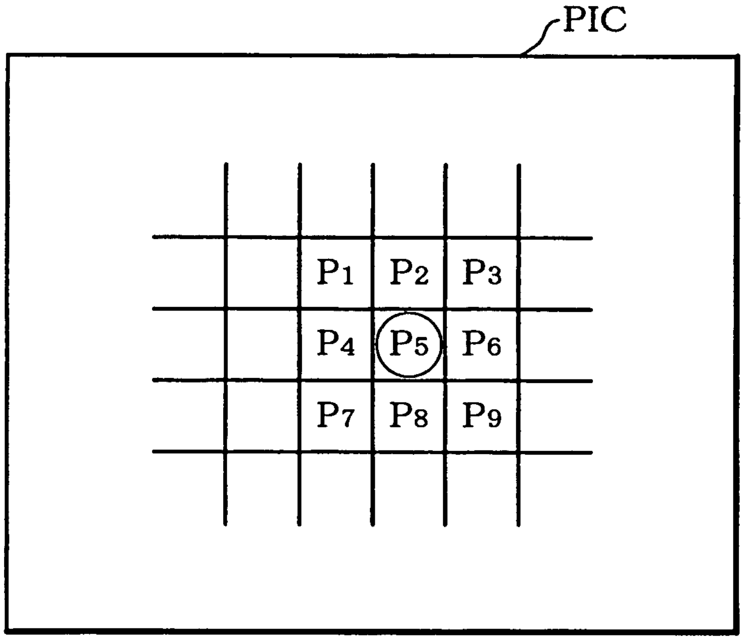
FIG. 18 is an explanatory drawing of an image processing performed by an image processing part in the second modification example.

FIG. 18 is an explanatory drawing of the effect process performed by the image processing part 360 in the second modification example.

As the effect process performed by the image processing part 360, for example, there are the averaging process of pixels, the edge enhancing process, the isolated point removing process and the color tone modifying process.

In the averaging process of pixels, a pixel value of each pixel in a image area PIC of the image data read out from the SRAM 24 is renewed by an average value averaging the pixel value and pixel values of eight pixels around the pixel. For example, a coefficient register, an offset register and a DIV value register are added to the control register 40. Assume that the image data of each pixel is in a YUV format and a target pixel is a pixel $P_5$ shown in FIG. 18, the renewed value is derived from the following formula by using pixel values $p_1$ though $p_9$ (pixel value of the pixel $P_5$ is $p_5$) of pixels $P_1$, $P_2 \ldots P_4$, $P_6 \ldots P_9$ around the pixel $P_5$, setting values ($k_1$ through $k_9$), a setting value (offset) of the offset register in the control register 40 and a setting value (DIV) of the DIV value register in the control register 40.

$$P_5=\text{offset}+(P_1\times k_1+P_2\times k_2+\ldots P_5\times k_5+\ldots+P_9\times k_9)/DIV \quad (1)$$

The renewed value is obtained with respect to each of a Y component, a U component and a V component from the above-referred formula and the pixel $P_5$ is renewed by these obtained values. In this way, an effect image in which the image is shaded off can be realized by performing the above-described process to each pixel in the image area PIC or a predetermined area.

In the edge enhancing process, a contrast between the pixel value of the pixel and a pixel value of the adjacent pixel is calculated with respect to the pixel value of each pixel in the image area PIC of the image data read out from the SRAM 24. If the calculated contrast exceeds a predetermined threshold value, the contrast is replaced by a corrected value in which the contrast is increased. In this way, it is possible to generate an effect image in which a contour of the image is emphasized by performing the above-described process to each pixel in the image area PIC or a predetermined area.

In the isolated point removing process, a pixel that is considered to be a noise is removed. For example, a difference between the pixel value of each pixel in the image area PIC of the image data read from the SRAM 24 and each pixel value of the eight pixels around the pixel is calculated. If the difference value is not within a predetermined range and the number of such difference values is more than a predetermined number, the pixel is judged as the noise and the correction process to correct the pixel is performed. In the correction process, the pixel value of the pixel is replaced by the average of the pixels values of the pixels around the pixel. In this way, it is possible to generate an effect image in which the isolated point that exits in the image is removed by performing the above-described process to each pixel in the image area PIC or a predetermined area.

In the color tone modifying process, when color information of each pixel in the image area PIC of the image data read out from the SRAM 24 is predetermined color information, it is corrected to be other color information. In this way, it is possible to generate an effect image in which a color balance is changed or a contrast is modified by performing the above-described process to each pixel in the image area PIC or a predetermined area.

The image processing part 360 may perform at least one of the above-mentioned processes, the averaging process of pixels, the edge enhancing process, the isolated point removing process and the color tone modifying process.

In the second modification example, the key color process may be performed when the data is transferred from the DRAM 22 to the SRAM 24 and when the data is transferred from the SRAM 24 to the DRAM 22 in the same way as the first modification example. The key color process may be performed only when the data is transferred from the SRAM 24 to the DRAM 22 in the second modification example. It is obvious that the display controller in the second modification example may be applied to the display system shown in FIG. 1.

As described above, the display controller in the embodiment, the first and second modification examples can be equipped with the DRAM 22 which has a large capacity. If the chip size becomes large because of the DRAM, it is preferable that the semiconductor chip is mounted on the display controller by a three dimensional packaging. To be more specific, so called stacked-type semiconductor device in which a first semiconductor chip and a second semiconductor chip are piled up. The DRAM 22 is formed in the first semiconductor chip and the SRAM 24 and the data transfer control part 30 are formed in the second semiconductor chip.

Figure 19:
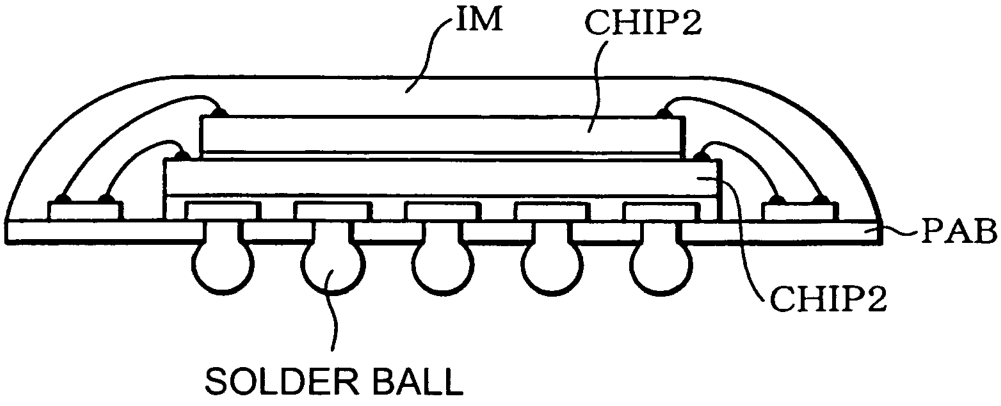
FIG. 19 is an explanatory drawing of the display controller in the embodiment, the first modification example and the second modification example.

FIG. 19 shows an example of a cross-sectional structure of the display controller formed as the stacked-type semiconductor device.

In this case, an electrode is provided on a package substrate PAB. The electrode is electrically coupled to a solder ball that serves as an external connection part and formed on the package substrate PAB. A first semiconductor chip CHIP1 in which the DRAM 22 is formed is provided on the package substrate PAB with an insulating layer interposed therebetween. A second semiconductor chip CHIP2 in which the SRAM 24 and the data transfer control part 30 are formed is provided on the first semiconductor chip CHIP1 with an insulating layer interposed therebetween.

An electrode is formed on each of the first semiconductor chip CHIP1 and the second semiconductor chip CHIP2 and electrically coupled to the electrode formed on the package substrate PAB with a bonding wire. The first semiconductor chip CHIP1 and the second semiconductor chip CHIP2 are sealed with an insulating resin IM.

By employing such packaging, it is possible to mount the display controller on the mobile devices even though the display controller has the large-capacity DRAM 22. It does not have any disadvantage compared with a display controller that only has a memory with a small chip size in terms of the packaging. It rather has an advantage of the large capacity DRAM 22.

3. Electronic Equipment

Figure 20:
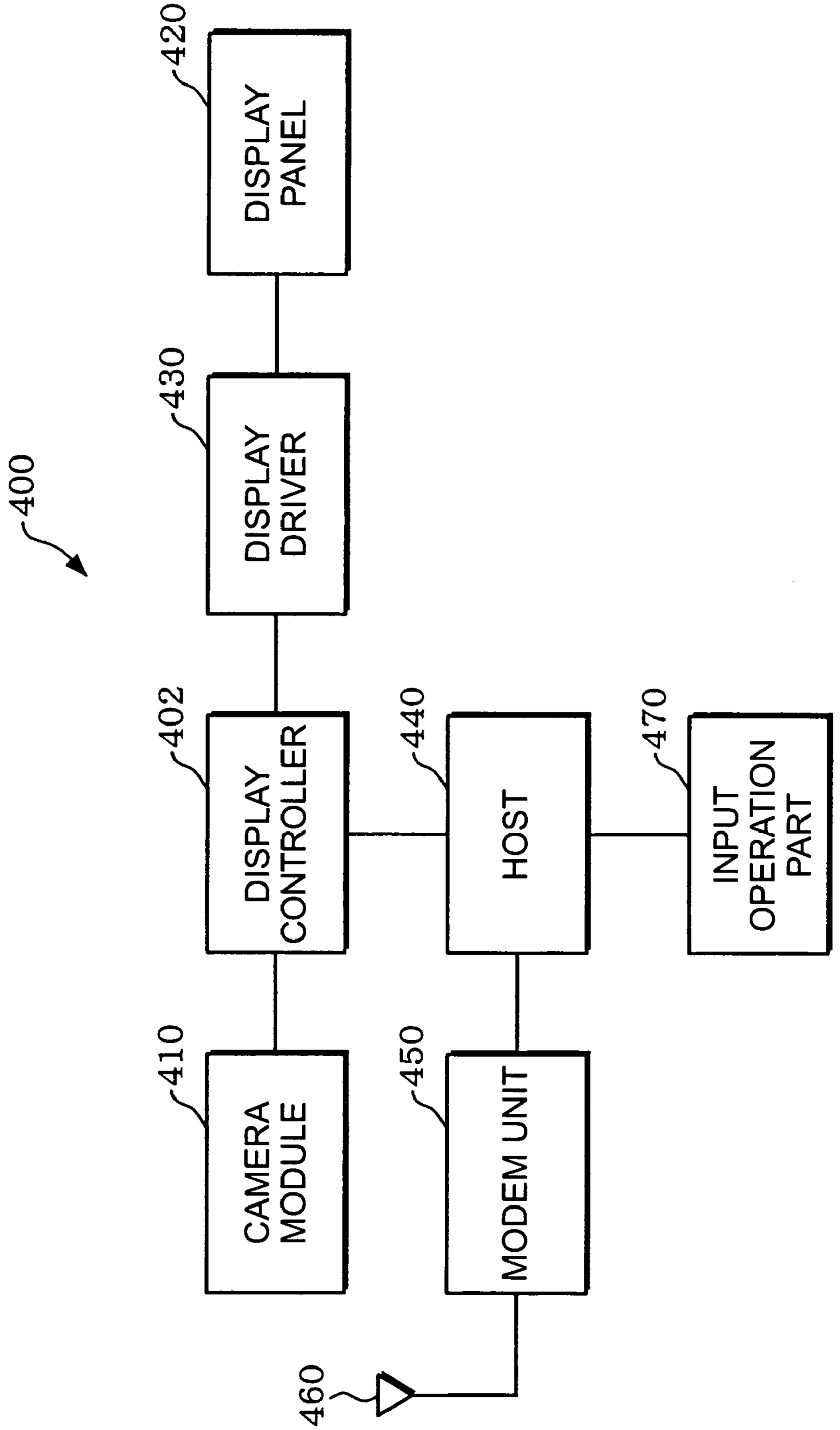
FIG. 20 is a block diagram showing a configuration example of electronic equipment to which the display controller according to the embodiment, the first and the second modification example is applied.

FIG. 20 is a block diagram schematically showing a structure of electronic equipment to which the display controller according to the embodiment, the first and the second modification example is applied. Here, as the electronic equipment, a cellular phone is taken as an example and a block diagram of the configuration example of the cellular phone is shown.

A cellular phone 400 includes a camera module 410. The camera module 410 includes a Charge-Coupled device (CCD) camera and supplies an image data taken by the CCD camera in YUV format to a display controller 402. As the display controller 402, the display controller described in the embodiment, the first modification example and the second modification example can be adopted.

The cellular phone 400 includes a display panel 420. As the display panel 420, a liquid crystal display panel can be adopted. In this case, the display panel 420 is driven by a display driver 430. The display panel 420 includes a plurality of scan lines, a plurality of data lines and a plurality of picture elements. The display driver 430 has a function of a scan driver which is to select a one scan line or a few scan lines out of the plurality of scan lines and a function of a data driver which is to supply a voltage that corresponds to the image data to the plurality of the data lines.

The display controller 402 is coupled to the display driver 430 and supplies an image data in RGB format to the display driver 430. Transfer of the image data between the RGB format and the YUV format can be conducted in the display controller 402.

A host 440 is coupled to the display controller 402. The host 440 controls the display controller 402. The host 440 can also decode the image data received through an antenna 466 in a modem unit 450 and supply the decoded data to the display controller 402. The display controller 402 displays the image on the display panel 420 by the display driver 430 based on the image data.

The host 440 can modulate the image data that is generated in the camera module 410 in the modem unit 450. The host 440 can then instruct to send the image data to other communication devices through the antenna 460.

The host 440 performs the sending or receiving process of the image data, an encoding process, a process of taking images by the camera module 410 and a display process of the display panel according to instructional information from an input operation part 470.

Though the liquid crystal panel is described as the example of the display panel 420 in FIG. 24, the case is not limited to this. The display panel 420 may be an electroluminescence or plasma display device and the present invention can be applied to the display controller which supplies the image data to the display driver that drives these devices.

The present invention is not limited to the above-described embodiments but applied to various kinds of modifications within the scope and spirit of the present invention.

Though the DRAM was taken as an example for the memory that is accessed by the sequential access operation having the shorter access time than that of the random access operation in the above-described embodiments, the present invention is not limited to this. The invention is also not limited by a structure of the memory element. The structure of the memory element may be the DRAM memory element and a way to access the memory may be a way like accessing the SRAM. Moreover, though the SRAM was taken as an example for the memory having the smaller power consumption compared with the DRAM at the time of the access, the invention is not limited to this and not limited by the structure of the memory element.

In inventions according to the dependent claims laid out herein, note that a part of the components appear in the independent claim may be omitted. Also note that essential parts of the independent claim may depend on other independent claim.

What is claimed is:

1. A display controller, comprising:

a display driver driving a display panel and to which image data is supplied from the display controller;

a first memory storing image data and being accessed with a sequential access operation having a shorter access time per predetermined data unit than an access time of a random access operation;

a second memory storing image data and consuming a less power than the first memory does at a time of the access operation;

a first key color register in which a first key color data is set;

a second key color register in which a second key color data is set; and a data transfer control part performing an image data transfer control between the first memory and the second memory, the data transfer control part performing a control to read out an image data from the first memory and write the image data in the second memory, an image processing being performed to the image data written in the second memory by the writing control, the data transfer control part performing a control to read out the image data that is rewritten in the second memory after the image processing from the second memory and to write the image data in the first memory, the image data written in the first memory by the data transfer control part or the image data stored in the second memory being supplied to the display driver, and the data transfer control part performing a control to write an image data of a pixel that is read out from the second memory and whose pixel value is inconsistent with the second key color data into the first memory.

2. The display controller according to claim 1, the data transfer control part performing a control to write an image data of a pixel that is read out from the first memory and whose pixel value is inconsistent with the first key color data into the second memory.

3. The display controller according to claim 2, the data transfer control part masking a writing control signal for writing the image data of the pixel read out from the first memory into the second memory if the pixel value of the pixel in the image data read out from the first memory conforms to the first key color data.

4. An electronic equipment, comprising:

the display controller according to claim 1; and a display driver driving the display panel based on an image data supplied from the display controller.

5. The electronic equipment according to claim 4, further comprising:

a host inputting and outputting the image data to/from the display controller.

6. A display controller comprising:

a first memory;

a second memory;

a data transfer control part that controls an image data transfer between the first memory and the second memory;

a first key color register; and a second key color register;

a first datum, inconsistent with a first key color datum that has been stored in the first key color register among first image data read out from the first memory, being written in the second memory; and a second datum, inconsistent with a second key color datum that has been stored in the second key color register among second image data read out from the second memory, being written in the first memory.

7. The display controller according to claim 6, the data transfer control part masking a writing control signal for writing image data of a pixel read out from the second memory into the first memory if a pixel value of the pixel in the image data read out from the second memory conforms to the second key color data.

8. The display controller according to claim 6, further comprising:

a host interface performing an interface process from and to a host, image data read out from the second memory being outputted to the host through the host interface and image data resulting from an image processing performed by the host being inputted through the host interface and written into the second memory.

9. The display controller according to claim 6, further comprising:

an image processing part performing an image processing to image data read out from the second memory and writing the image data after the image processing into the second memory.

10. The display controller according to claim 9, the image processing part performing at least one of an averaging process, an edge enhancing process, an isolated point removing process and a color tone modifying process to the image data read out from the second memory.

11. The display controller according to claim 6, further comprising:

a display driver interface for supplying image data written in the first memory by the data transfer control part or the image data stored in the second memory to a display driver.

12. The display controller according to claim 6, the first memory being a dynamic random access memory and the second memory being a static random access memory.

13. The display controller according to claim 12, the display controller being a stacked type semiconductor device in which a first chip including the first memory and a second chip including the second memory and the data transfer control part are piled up.

14. A method for supplying image data to a display driver that drives a display panel, comprising:

reading out an image data stored in a first memory and writing the image data in a second memory;

performing an image processing to the image data written in the second memory and writing the image data after the image processing in the second memory;

reading out the image data after the image processing from the second memory and writing the image data in the first memory; and supplying the image data written in the first memory to the display driver;

an image data of a pixel that is read out from the second memory and whose pixel value is inconsistent with a predetermined second key color data being written into the first memory.

15. The method for supplying image data to a display driver that drives a display panel according to claim 14, an image data of a pixel that is read out from the first memory and whose pixel value is inconsistent with a predetermined first key color data being written into the second memory.

16. The method for supplying image data to a display driver that drives a display panel according to claim 14, the first memory being a dynamic random access memory and the second memory being a static random access memory.

* * * * *